(12) United States Patent
Nakashima

(10) Patent No.: US 9,048,957 B2
(45) Date of Patent: Jun. 2, 2015

(54) SIGNAL PROCESSING CIRCUIT, OPTICAL RECEIVER, DETECTOR AND METHOD FOR COMPENSATING FOR WAVEFORM DISTORTION

(75) Inventor: Hisao Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 784 days.

(21) Appl. No.: 12/822,348

(22) Filed: Jun. 24, 2010

(65) Prior Publication Data

US 2010/0329698 A1 Dec. 30, 2010

(30) Foreign Application Priority Data

Jun. 30, 2009 (JP) ................................. 2009-155436

(51) Int. Cl.
*H04B 10/60* (2013.01)
*H04B 10/61* (2013.01)

(52) U.S. Cl.
CPC ............ *H04B 10/6161* (2013.01); *H04B 10/60* (2013.01); *H04B 10/613* (2013.01); *H04B 10/614* (2013.01)

(58) Field of Classification Search
CPC ............................. H04B 10/0795; H04B 10/60
USPC ................................................ 398/208–210
See application file for complete search history.

(56) References Cited

U.S. PATENT DOCUMENTS

| | | | |
|---|---|---|---|
| 6,621,862 B1 * | 9/2003 | Dabell ........................... | 375/229 |
| 6,871,024 B2 * | 3/2005 | Nishimoto et al. ........... | 398/159 |
| 7,477,848 B2 | 1/2009 | Ooi et al. | |
| 7,596,323 B1 * | 9/2009 | Price et al. .................... | 398/141 |
| 7,613,403 B2 | 11/2009 | Hironishi et al. | |
| 7,623,796 B2 * | 11/2009 | Liu ................................ | 398/202 |
| 7,636,525 B1 * | 12/2009 | Bontu et al. .................. | 398/208 |
| 7,684,712 B1 * | 3/2010 | Roberts et al. ................ | 398/208 |
| 7,711,273 B2 * | 5/2010 | Koc ............................... | 398/202 |

(Continued)

FOREIGN PATENT DOCUMENTS

| JP | 2002-208892 A | 7/2002 |
|---|---|---|
| JP | 2004-236097 A | 8/2004 |

(Continued)

OTHER PUBLICATIONS

Ly-Gagnon, Danny-Sebastien et al., "Coherent Detection of Optical Quadrature Phase-Shift Keying Signals With Carrier Phase Estimation", Journal of Lightwave Technology, vol. 24, No. 1, Jan. 2006, pp. 12-21.

*Primary Examiner* — David Payne
*Assistant Examiner* — Tanya Motsinger
(74) *Attorney, Agent, or Firm* — Fujitsu Patent Center

(57) ABSTRACT

A signal processing circuit includes: a first compensator configured to compensate for waveform distortion corresponding to chromatic dispersion of a received optical signal by using digital electrical signals obtained by sampling analog electrical signals by using a sampling signal, the analog electrical signals being obtained by opto-electric conversion of multiple optical signals that include an intensity of the received optical signal and phase information thereon; and a chromatic dispersion compensation controller configured to control a compensation value for the chromatic dispersion in the first compensation from the digital electrical signals in which the chromatic dispersion has been compensated for on the basis of a detected phase offset between the sampling signal and a modulation frequency of the received optical signal.

16 Claims, 20 Drawing Sheets

(56) References Cited

U.S. PATENT DOCUMENTS

| | | | |
|---|---|---|---|
| 7,894,728 B1 * | 2/2011 | Sun et al. | 398/208 |
| 8,073,345 B2 * | 12/2011 | Chen et al. | 398/205 |
| 8,301,037 B2 * | 10/2012 | Pfau | 398/205 |
| 8,761,614 B2 * | 6/2014 | Greshishchev et al. | 398/204 |
| 8,818,209 B1 * | 8/2014 | Snelgrove et al. | 398/202 |
| 2002/0080898 A1 * | 6/2002 | Agazzi et al. | 375/355 |
| 2003/0123884 A1 * | 7/2003 | Willner et al. | 398/212 |
| 2004/0184813 A1 * | 9/2004 | Mikami | 398/147 |
| 2005/0196176 A1 * | 9/2005 | Sun et al. | 398/152 |
| 2006/0263005 A1 * | 11/2006 | Papakos et al. | 385/27 |
| 2006/0285854 A1 * | 12/2006 | Sun et al. | 398/155 |
| 2007/0092260 A1 * | 4/2007 | Bontu et al. | 398/152 |
| 2008/0056710 A1 | 3/2008 | Ooi et al. | |
| 2009/0129787 A1 * | 5/2009 | Li et al. | 398/208 |
| 2009/0142076 A1 * | 6/2009 | Li et al. | 398/208 |
| 2009/0201796 A1 * | 8/2009 | Roberts et al. | 370/210 |
| 2009/0310665 A1 * | 12/2009 | Agazzi et al. | 375/229 |
| 2010/0329677 A1 * | 12/2010 | Kaneda et al. | 398/65 |
| 2010/0329697 A1 * | 12/2010 | Koizumi et al. | 398/208 |

FOREIGN PATENT DOCUMENTS

| | | | |
|---|---|---|---|
| JP | 2007-60583 A | 3/2007 | |
| JP | 2007-67955 A | 3/2007 | |
| JP | 2008-58610 A | 3/2008 | |

* cited by examiner

SIGNAL PROCESSING CIRCUIT, OPTICAL RECEIVER, DETECTOR AND METHOD FOR COMPENSATING FOR WAVEFORM DISTORTION

CROSS-REFERENCE TO RELATED APPLICATION

This application is based upon and claims the benefit of priority of the prior Japanese Patent Application No. 2009-155436, filed on Jun. 30, 2009, the entire contents of which are incorporated herein by reference.

FIELD

A certain aspect of the embodiments discussed herein is related to a signal processing circuit, an optical receiver, a detector and a method for compensating for waveform distortion.

BACKGROUND

In optical communication systems, there has been considerable activity in the development of an optical receiver capable of handling signals transmitted at rates of, for example, 40 Gbps, 100 Gbps or higher per wavelength. Recently, a digital coherent receiver has attracted attention as a receiver in the optical communication systems. The digital coherent receiver may operate as follows. The receiver extracts information about the optical intensity and phase by coherent receiving, and digitizes the extracted information. Then, the receiver demodulates the digitized information by a digital signal processing circuit.

The optical communication systems are configured to employ dispersion compensation including chromatic dispersion. In the digital coherent receiver, chromatic dispersion on the transmission path may be compensated for by using the digital signal processing technology. However, the receiver may be configured to estimate the chromatic dispersion on the transmission path and compensate for the estimated chromatic dispersion. As a method for chromatic dispersion compensation, there is known a method for setting the compensation value for dispersion on the basis of the number of corrections by an error correction circuit after demodulation so as to minimize the number of corrections (see Japanese Laid-Open Patent Application Publication Nos. 2002-208892, 2004-236097 and 2008-58610). There is known another method for optimizing the compensation value for chromatic dispersion on the basis of clocks reproduced by an analog clock reproducing circuit (see Japanese Laid-Open Patent Application Publication No. 2007-60583).

SUMMARY

According to an aspect of the present invention, there is provided a signal processing circuit including: a first compensator configured to compensate for waveform distortion corresponding to chromatic dispersion of a received optical signal by using digital electrical signals obtained by sampling analog electrical signals by using a sampling signal, the analog electrical signals being obtained by opto-electric conversion of multiple optical signals that include an intensity of the received optical signal and phase information thereon; and a chromatic dispersion compensation controller configured to control a compensation value for the chromatic dispersion in the first compensation from the digital electrical signals in which the chromatic dispersion has been compensated for on the basis of a detected phase offset between the sampling signal and a modulation frequency of the received optical signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A certain aspect of an embodiment takes the following into consideration. It takes a considerable long time to set the optimal compensation value for chromatic dispersion when the method that sets the compensation value on the basis of the number of corrections in forward error correction is used. The method that employs the analog clock recovery uses a clock recovery circuit of analog type. In the optical transmission system using the digital coherent receiver, the receiver handles a considerable large amount of chromatic dispersion because large chromatic dispersion is compensated for by waveform distortion compensation or equalization by digital signal processing. It is thus difficult to employ the analog clock recovery in the digital coherent receiver and set the compensation value in the waveform distortion compensator using the analog clock recovery. It is desired that the digital coherent optical receiver carries out the dispersion compensation appropriately.

According to an aspect of an embodiment, the dispersion compensation may be carried out appropriately.

A description will now be given of embodiments with reference to the accompanying drawings.

[First Embodiment]

Figure 1:
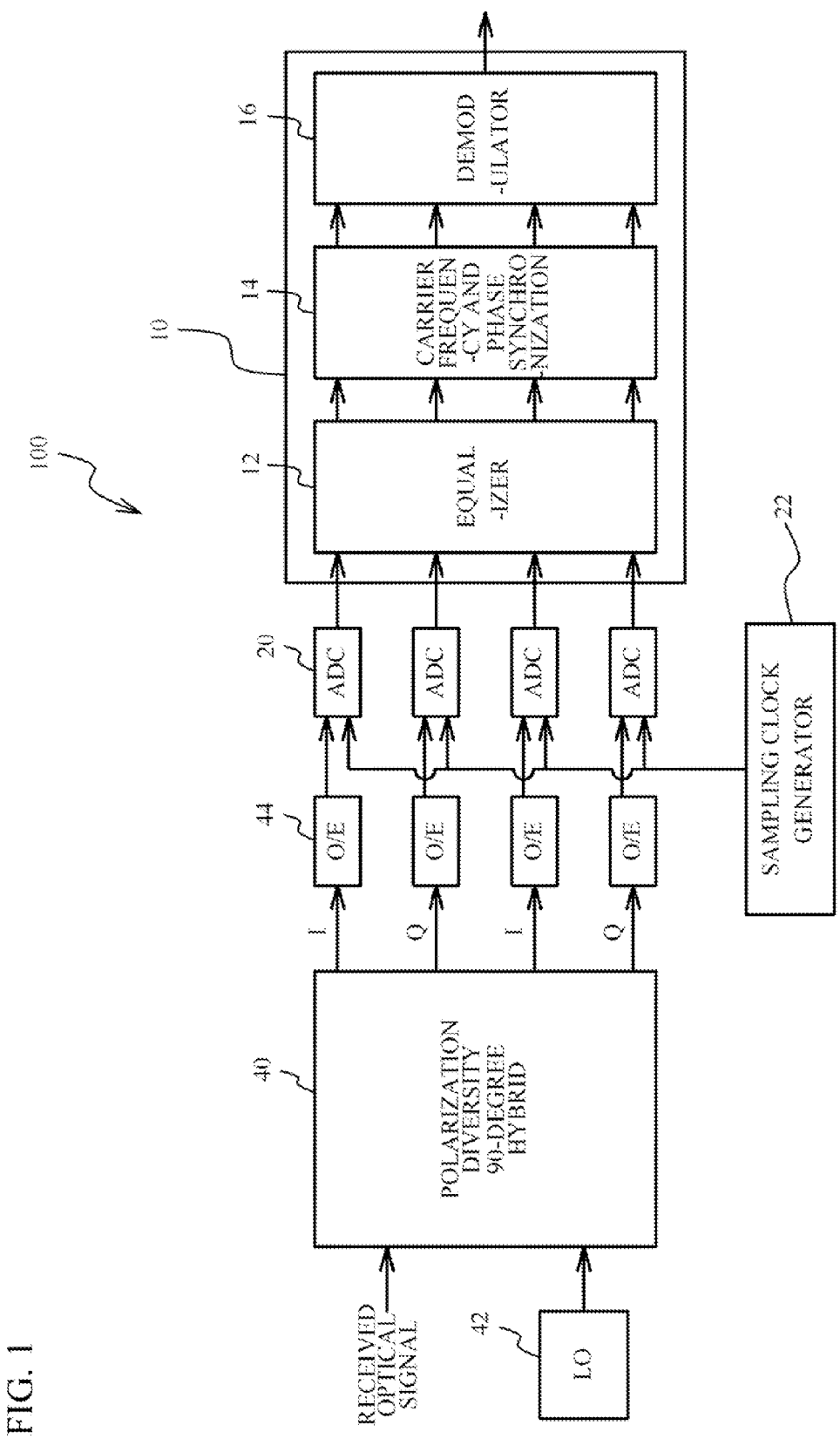
FIG. 1 is a block diagram of an optical receiver.

FIG. 1 is a block diagram of an optical receiver in accordance with a first embodiment. Referring to FIG. 1, a received optical signal may have a single wavelength that is one of wavelengths obtained by demultiplexing a wavelength-multiplexed optical signal. The received optical signal may have a transmission rate of 40 Gbps or 100 Gbps and has been modulated by QPSK (Quadrature Phase shift Keying). The received optical signal is mixed with local light emitted by a local optical oscillator (LO) 42 at a polarization diversity 90-degree hybrid circuit 40, which extracts real-part signals and imaginary-part signals having orthogonal polarization. Hereinafter, the real-part signals are referred to as I (in phase) and the imaginary-part signals are referred to as Q (quadrature phase). The received optical signal is demodulated by using multiple optical signals that include intensity information and phase information.

An opto-electric conversion circuit (O/E) 44 converts the multiple analog optical signals of the I and Q of the polarized waves output by the 90-degree hybrid circuit 40 into analog electrical signals. Analog-to-digital circuits (ADC) 20 convert the analog electrical signals into digital electrical signals by sampling the analog electrical signals from the O/E conversion circuits 44 at timings synchronized with a sampling signal. A sampling clock generator 22 outputs the sampling signal used in A/D conversion by the ADCs 20. For example, the sampling frequency may be twice the modulation frequency of the received optical signal. The outputs of the ADCs 20 are applied to a digital signal processing circuit 10.

The digital signal processing circuit 10 is equipped with an equalizer 12, a carrier frequency and phase synchronization circuit 14, a demodulator 16 and a sampling phase offset detector 28. The equalizer 12 compensates for a waveform distortion caused when the optical signal propagates through the optical transmission path. Waveform distortion that may be compensated for the equalizer 12 may be chromatic dispersion, polarization state dynamics, and polarization mode dispersion. The carrier frequency and phase synchronization circuit 14 corrects a phase rotation due to the difference in frequency or phase between the carrier frequency and the local light frequency to thus pull the signals in phase. The demodulator 16 identifies the signal to reproduce the digital signal.

Figure 2:
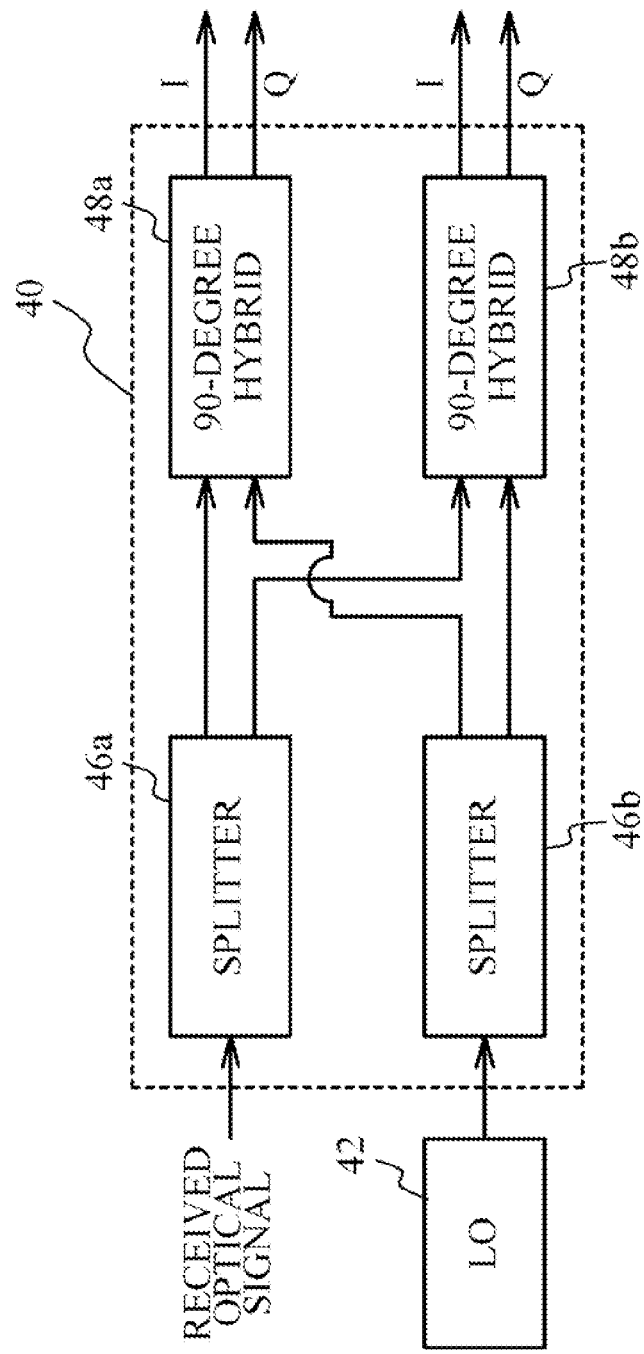
FIG. 2 is a block diagram of a polarization diversity 90-degree hybrid circuit.

FIG. 2 is a block diagram of the polarization diversity 90-degree hybrid circuit 40. Referring to FIG. 2, the 90-degree hybrid circuit 40 is equipped with two polarized beam splitters 46a and 46b, and 90-degree hybrids 48a and 48b. The polarized beam splitter 46a splits the received optical signal into optical signals in two polarization states, and the polarized beam splitter 46b splits the local light into optical signals in the two polarization states. The 90-degree hybrid 48a extracts the I from the optical signal by using the local light in the corresponding polarization states, and the 90-degree hybrid 48b extracts the Q from the optical signal by using the local light in the corresponding polarization states.

Figure 3:
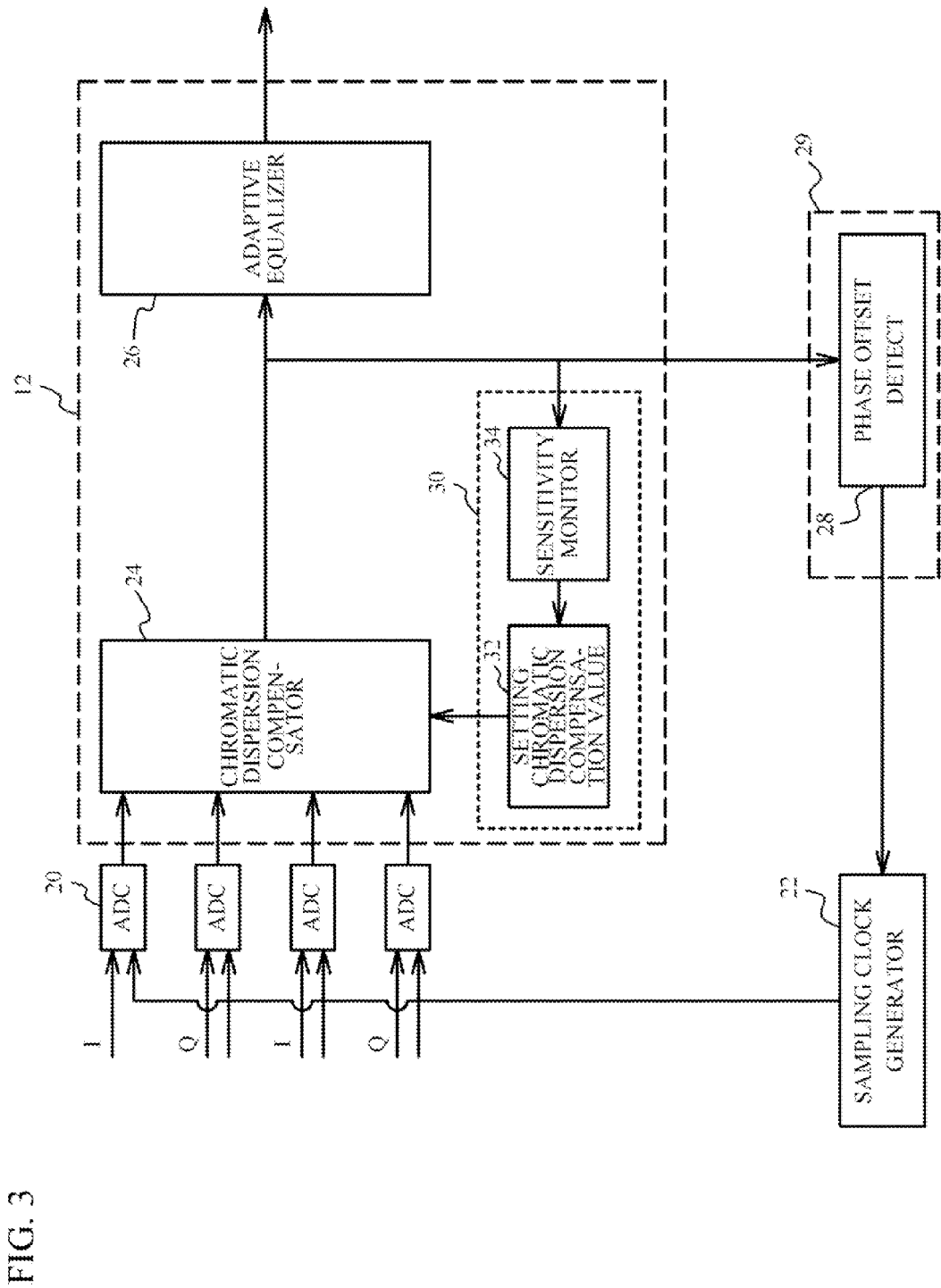
FIG. 3 is a block diagram of an equalizer and its peripheral circuits.

A further description is given, with reference to FIG. 3, of the equalizer 12. The equalizer 12 is equipped with a chromatic dispersion compensator 24, which functions as a first compensator, an adaptive equalizer 26, which functions as a second compensator, and a chromatic dispersion compensation controller 30. The chromatic dispersion compensator 24 compensates for chromatic dispersion, which is one of the waveform distortions. The chromatic dispersion compensator 24 compensates for waveform distortion that corresponds to chromatic dispersion of the optical signal included in the digital electrical signals. The adaptive equalizer 26 compensates for waveform distortion that remains in the output signal of the chromatic dispersion compensator 24 in an adaptive equalization manner. Exemplary remaining waveform distortion may be a variation in the polarized state dynamics, a polarization mode dispersion, and chromatic dispersion that is not compensated for the chromatic dispersion compensator 24.

Figure 4:
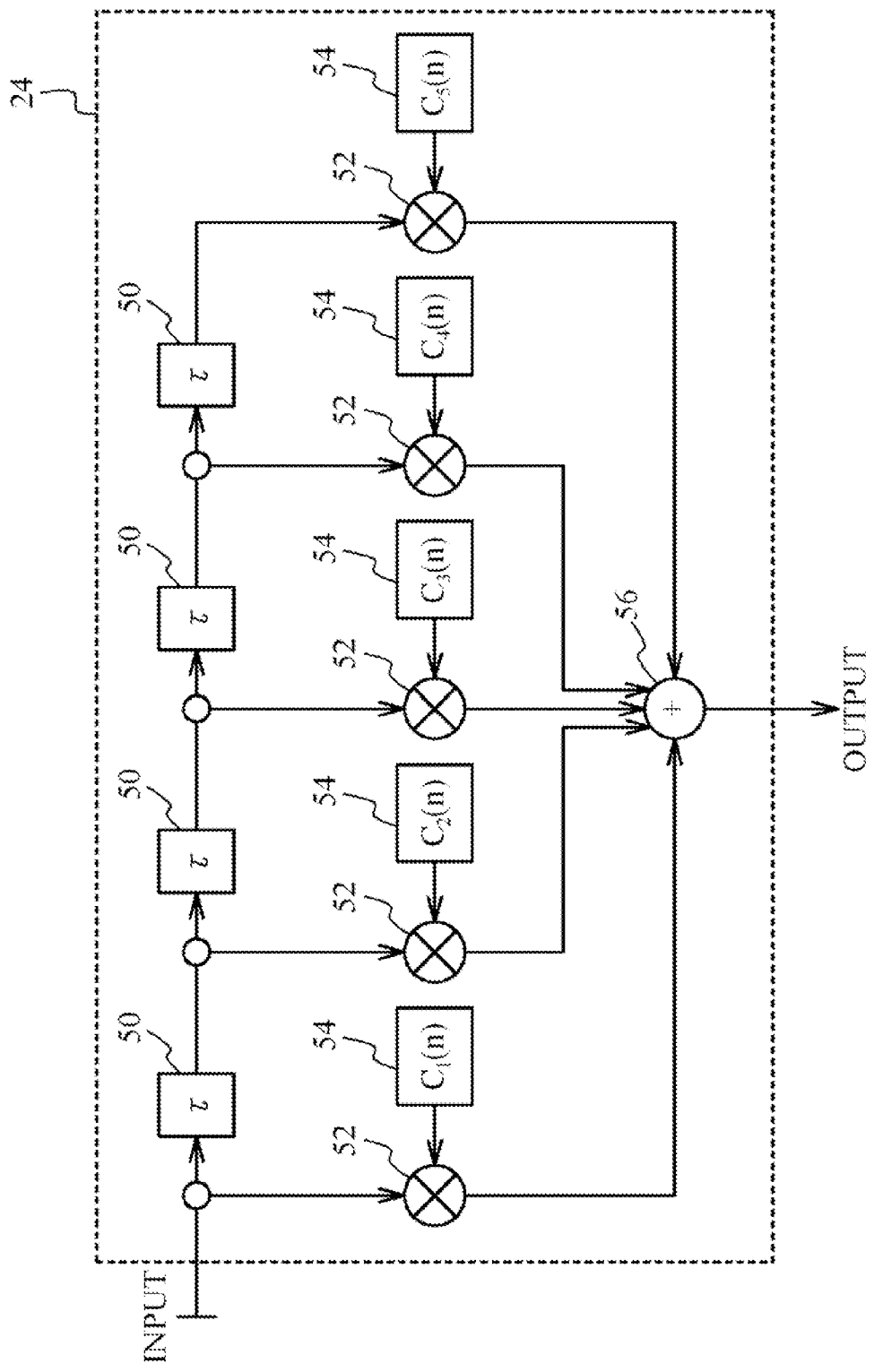
FIG. 4 is a block diagram of an exemplary configuration of a chromatic dispersion compensator.

FIG. 4 is a block diagram of an exemplary configuration of the chromatic dispersion compensator 24. Referring to FIG. 4, the chromatic dispersion compensator 24 is an FIR (finite impulse response) filter, and includes delay elements 50, FIR coefficients 54, multipliers 52 and an adder 56. The delay elements 50 delay the input signals by time τ. The multipliers 52 multiply the delayed signals by the FIR coefficients $C_k(n)$ where k indicates the number of coefficients and is equal to 1-5 in FIG. 4. An arbitrary number of k may be used. The adder 56 adds the signals from the multipliers 52. The chromatic dispersion may be compensated for by setting the FIR coefficients appropriately.

Figure 5:
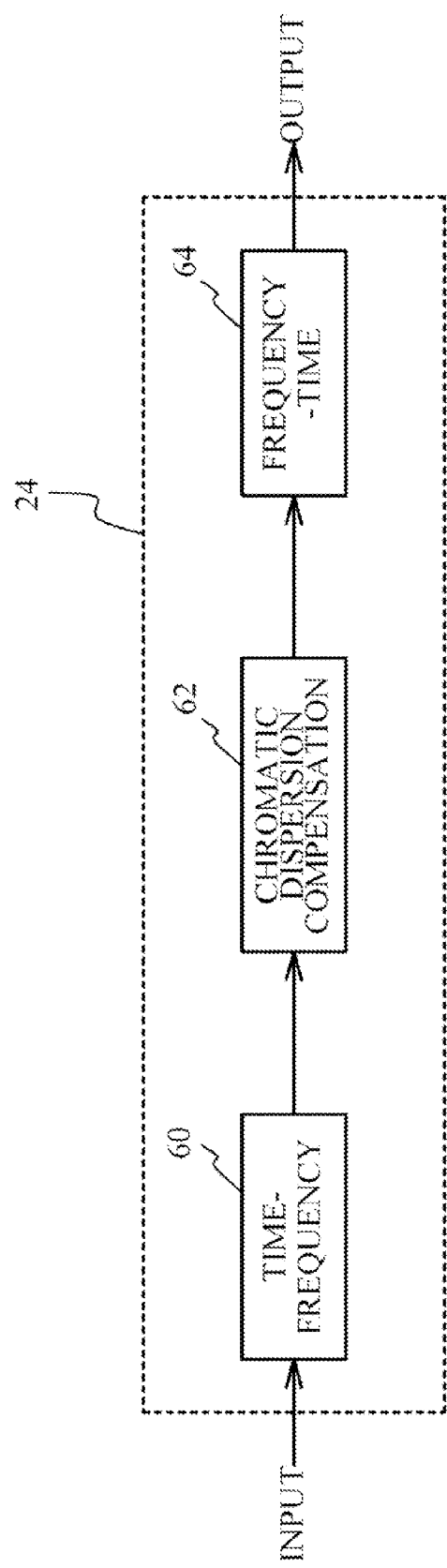
FIG. 5 is a block diagram of another configuration of the chromatic dispersion compensator.

FIG. 5 is a block diagram of another exemplary configuration of the chromatic dispersion compensator 24. Referring to FIG. 5, the chromatic dispersion compensator 24 includes a time to frequency domain converting part 60, a frequency domain chromatic compensation part 62, and a frequency to time domain converting part 64. The time to frequency domain converting part 60 subjects the input signal to FFT (fast Fourier transform) to convert the input signal into a signal in the frequency domain. The frequency domain dispersion compensation part 62 carries out chromatic dispersion compensation in the frequency domain. The frequency to time domain region converting part 64 subjects the signal that has been compensated for in terms of chromatic dispersion to inverse FFT to convert the signal into that in the time domain. As described above, the chromatic dispersion compensation may be carried out in the frequency domain.

Figure 6:
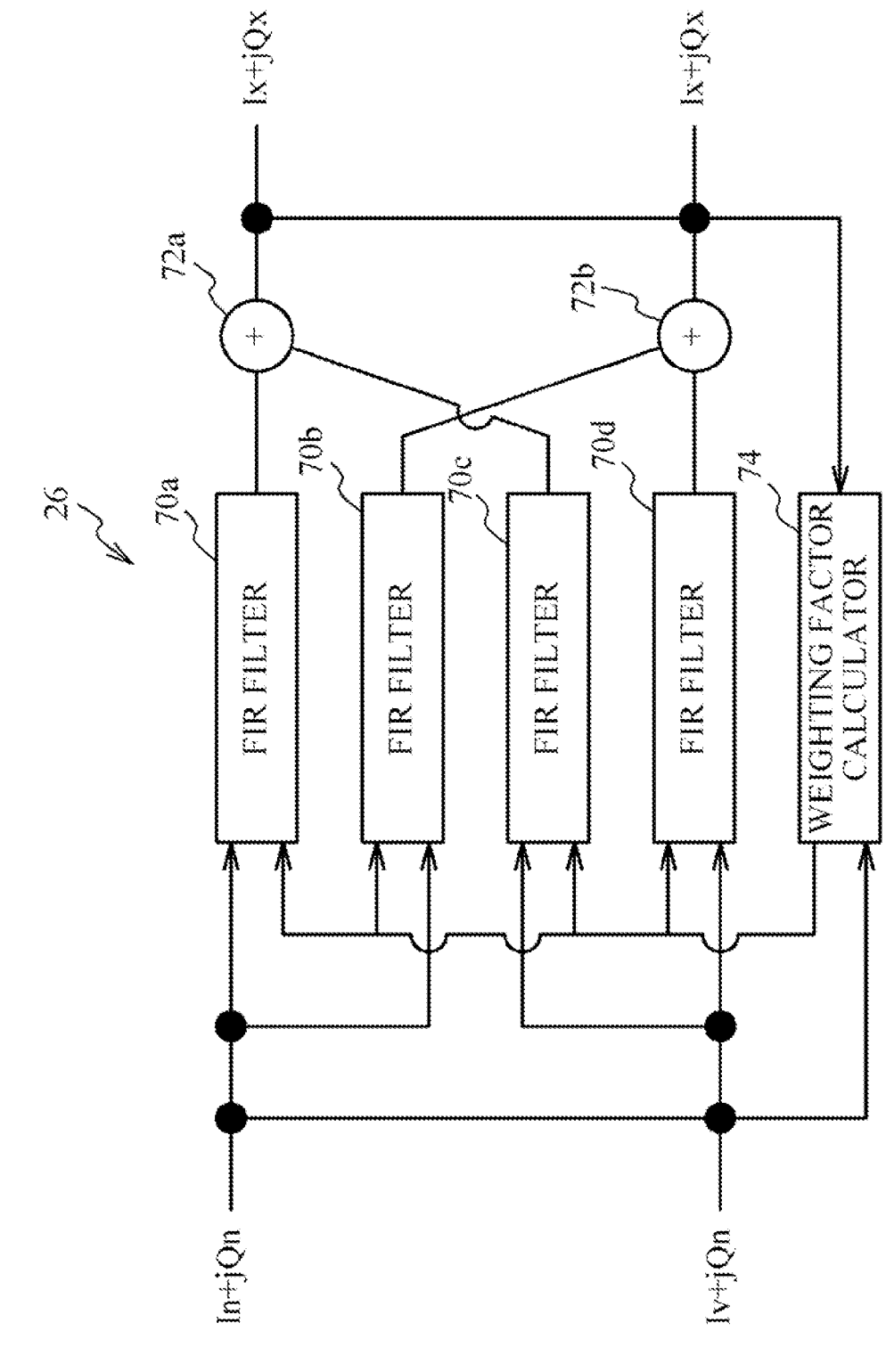
FIG. 6 is a block diagram of an exemplary configuration of an adaptive equalizer.

FIG. 6 is a block diagram of an exemplary structure of the adaptive equalizer 26. Referring to FIG. 6, the adaptive equalizer 26 is equipped with FIR filters 70a through 70d, adders 72a and 72b, and a weighting factor calculator 74. The adaptive equalizer 26 is supplied with a signal of a horizontally polarized state Ih+jQh and a signal of a vertically polarized state Iv+jQv. The signal Ih+jQh is supplied to the FIR filters 70a and 70b, and the signal Iv+jQv is supplied to the FIR filters 70c and 70d. The adder 72a adds the outputs of the FIR filters 70a and 70c, and outputs an added signal Ix+jQx. The adder 72b adds the outputs of the FIR filters 70b and 70d, and outputs an added signal Iy+jQy. The weighting factor calculator 74 calculates weighting factors of the FIR filters 70a through 70d by using the input signals Ih+jQh and Iv+jQv. For example, the weighting factor calculator 74 calculates the weighting factors so as to compensate for waveform distortion of the output signals more effectively (that is, so as to reduce waveform distortion due to residual dispersion). With the above structure, polarization mode dispersion may be compensated for in addition to chromatic dispersion.

Turning back to FIG. 3, the sampling signal control circuit 29 is equipped with the sampling phase offset detector 28. This detector 28 detects a phase offset between the sampling signal used for the A/D conversion and the analog electrical signal applied to the ADCs 20, that is, the modulation frequency of the received optical signal. The sampling signal control circuit 29 controls the sampling clock generator 22 on the basis of the detected phase offset to control the phase or frequency of the sampling signal. Thus, it is possible to synchronize the received optical signal with the sampling signal.

The chromatic dispersion compensation controller 30 is equipped with a sensitivity monitor 34 and a part of setting the compensation value for chromatic dispersion. The sensitivity monitor 34 monitors the sensitivity of detecting the offset of sampling phase. The part 32 of setting the compensation value for chromatic dispersion sets the compensation value for chromatic dispersion in the chromatic dispersion compensator 24 on the basis of the monitored sensitivity. For example, in the example of FIG. 4, the chromatic dispersion compensator 24 sets the values of the FIR coefficients $C_k(n)$.

Figure 7:
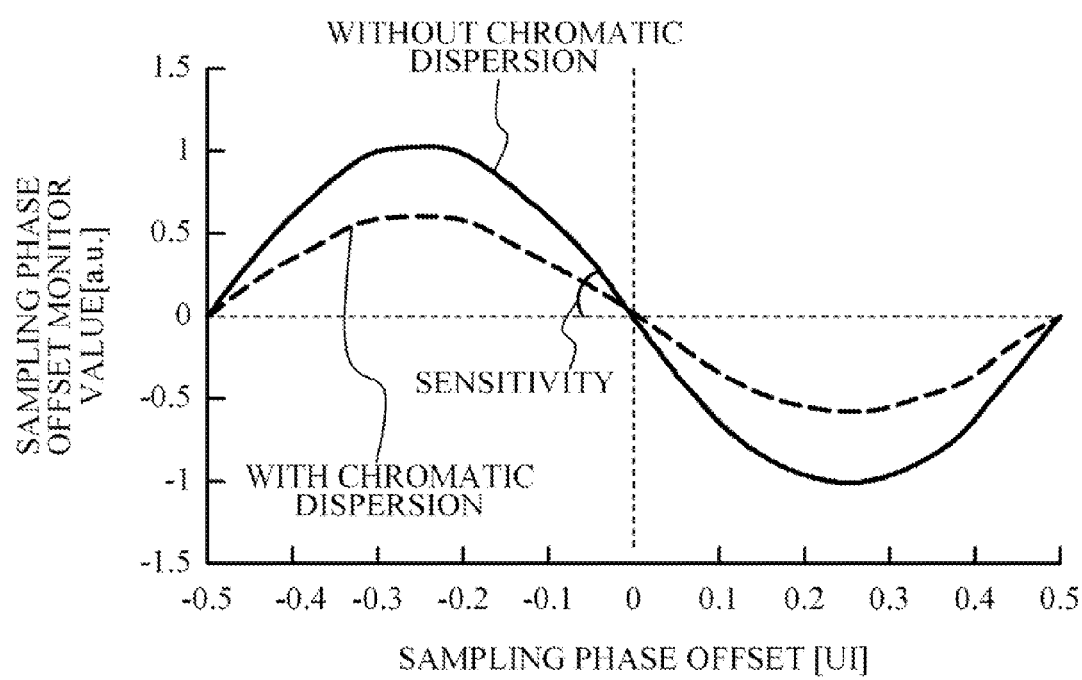
FIG. 7 schematically illustrates sampling phase offset monitor values.

FIG. 7 schematically illustrates the sampling phase offset monitor value of the sampling phase offset detector 28 with respect to the sampling phase offset. For example, the sampling phase offset (which is the phase offset between the sampling signal and the analog electrical signal applied to the ADCs 20) is equal to 1 for a one-cycle offset. When the sampling phase offset is equal to zero, the phase of the sampling signal is in phase with the analog electrical signals applied to the ADCs 20. When the sampling phase offset varies from zero, there is a phase offset between the sampling signal and the analog electrical signals applied to the ADCs 20. A solid line indicates a case where the chromatic dispersion is compensated for in the chromatic dispersion compensator 24, and a broken line indicates a case where there is a residual chromatic dispersion. Referring to the solid line, when the sampling phase offset is zero, the sampling phase does not have any offset and the output value of the sampling phase offset detector 28, namely, the sampling phase offset monitor value is zero. When the sampling phase shifts from zero, the output value shifts from zero. The sensitivity of detection of the sampling phase offset is defined as the absolute value of the slope obtained for phase offsets close to zero ($\Delta A/\Delta B$ where $\Delta A$ is the output value and $\Delta B$ is the phase offset with respect to the origin). When the sampling phase has an offset equal to ½ UI, the output value returns to zero. In the case where there is a residual chromatic dispersion as indicated by the broken line, the waveform is distorted by chromatic dispersion and the sensitivity of detection of phase offset is weakened.

Figure 8:
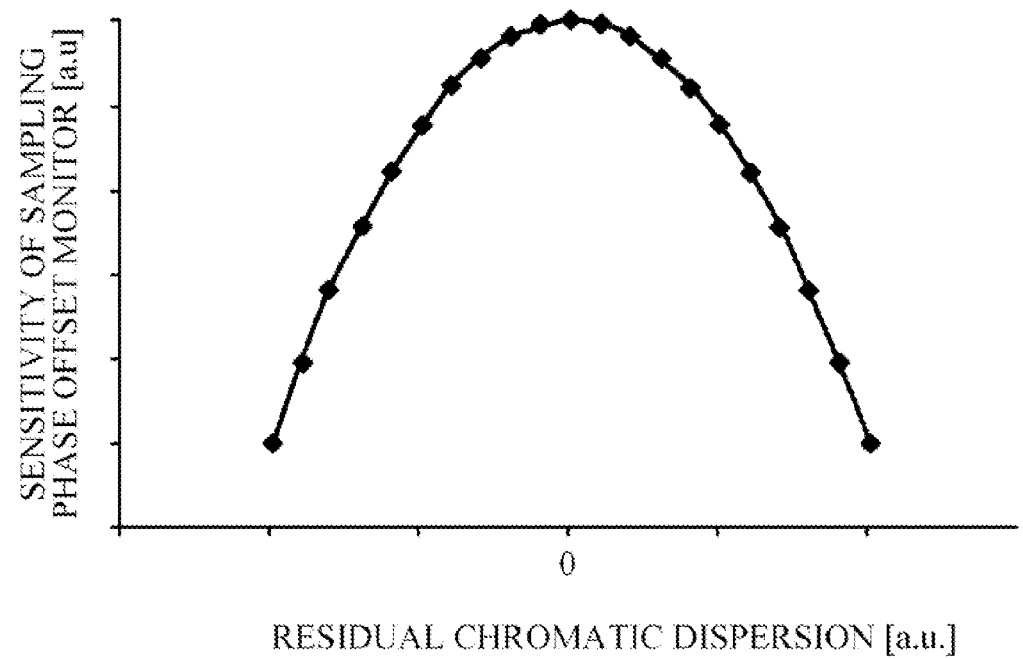
FIG. 8 schematically illustrates the sensitivity of sampling phase offset monitor with respect to residual chromatic dispersion.

FIG. 8 schematically illustrates the sensitivity of sampling phase offset monitor with respect to residual chromatic dispersion. Referring to FIG. 8, the residual chromatic dispersion indicates the difference between the compensation value of the chromatic dispersion compensator 24 and the compensation value for chromatic dispersion of the received optical signal. As illustrated in FIG. 8, when the residual chromatic dispersion is zero, the chromatic dispersion compensator 24 compensates for almost all of the chromatic dispersion. As illustrated in FIG. 8, when the residual chromatic dispersion deviates from zero, there is a large residual chromatic dispersion that is not compensated for by the chromatic dispersion compensator 24. As illustrated in FIG. 8, when the residual chromatic dispersion is zero, the sensitivity of detection or monitor of the sampling phase offset is maximized. As the residual chromatic dispersion deviates from zero, the sensitivity is reduced. The sampling phase offset may be detected by a method described in F. M. Gardner, ABPSK/QPSK Timing-Error Detector for Sampled Receiver, IEEE Trans. Commun. VOL. COM-34, No. 5, May 1986 or T. Tanimura et. Al, Digital clock recovery algorithm for optical coherent receivers operating independent of laser frequency offset, ECOC2008, Mo. 3. D.2.

Figure 9:
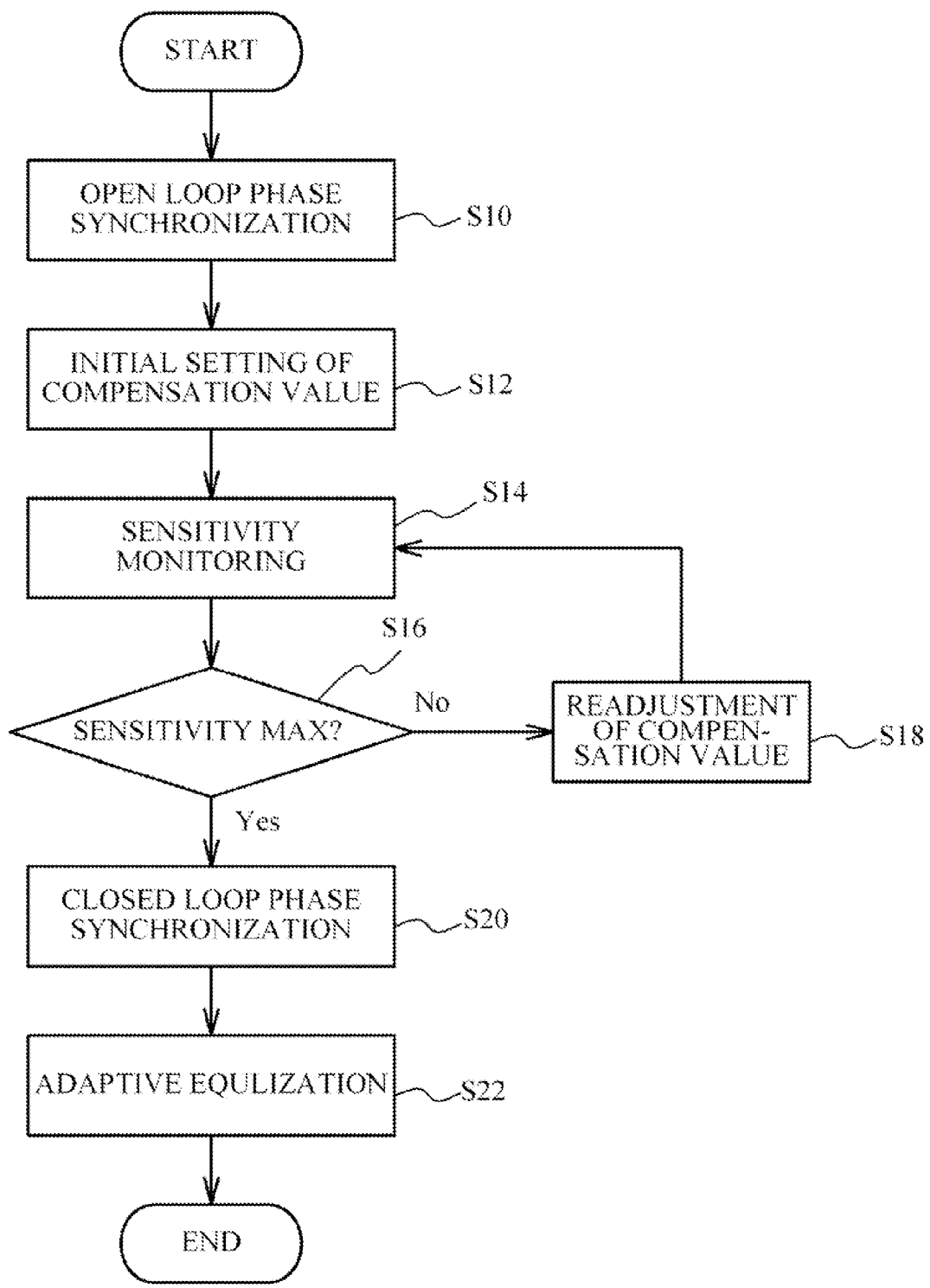
FIG. 9 is a flowchart of a process executed in a first embodiment.

FIG. 9 is a flowchart of a process of the first embodiment. Referring to FIG. 9, the sampling signal control circuit 29 steps feeding the sampling phase offset back to the sampling clock generator 22. Thus, the phase synchronization loop of the sampling signal is opened (step S10). This causes the frequency of the sampling signal to deviate from the modulation frequency of the signals applied to the ADCs 22. Thus, a sampling phase offset is swept. The part 32 of setting the compensation value for chromatic dispersion sets the compensation value (for example, the FIR coefficients illustrated in FIG. 4) to an initial value (step S12). The sensitivity monitor 34 monitors the sensitivity of detection of the sampling phase offset (step S14). The setting part 32 determines whether the sensitivity is at maximum (step S16). When the answer of step S16 is NO, the setting part 32 readjusts the compensation value (step S18).

After that, the process returns to step S14. When the answer of step S16 is YES, the sampling signal control circuit 29 starts to feed the sampling phase offset back to the sampling clock generator 22. Thus, the phase synchronization loop of the sampling signal is closed (step S20). Thus, the sampling signal is synchronized with the signals applied to the ADCs 22. Then, the adaptive equalizer 26 carries out adaptive equalization (step S22). Thereafter, the carrier frequency and phase synchronization circuit 14 and the demodulator 16 operate.

A description will now be given of a method of setting the compensation value by the setting part 32. The maximum compensation value is set as the initial value used at step S12. At step S18, the compensation value for chromatic dispersion is reduced each time step S18 is carried out. Thus, the sensitivity is increased. When the sensitivity becomes lower than that obtained at the previous step that is one step before the current step, the previous step is defined as the maximal sensitivity. As another example, a predetermined initial value is set at step S16. At step S18, the compensation value is alternately increased and decreased from the predetermined initial value so that the compensation value becomes farther away from the predetermined initial value as the number of times that step S16 is executed becomes larger.

According to the first embodiment, as steps S14 through S18 illustrated in FIG. 9, the chromatic dispersion compensation controller 30 controls the compensation value for chromatic dispersion from the digital electrical signals that haves been subjected to the compensation for chromatic dispersion by the chromatic dispersion compensator 24 on the basis of the phase offset between the sampling signal and the modulation frequency of the received optical signal detected by the sampling phase offset detector 28. It is thus possible to appropriately compensate for the waveform dispersion by controlling the compensation value for the chromatic dispersion on the basis of the detected phase offset.

The chromatic dispersion compensation controller 30 controls the compensation value for chromatic dispersion so that the detected phase offset increases. For example, as step S16 in FIG. 9, the compensation value is controlled so as to maximize the sensitivity of detection of the sampling phase offset. Thus, as illustrated in FIG. 8, it is possible to suppress the residual chromatic dispersion of the chromatic dispersion compensator 24.

In the first embodiment, as the compensation for waveform distortion, the chromatic dispersion is compensated for by the chromatic dispersion compensator 24, and the residual waveform distortion in the chromatic dispersion compensator 24 is compensated for by the adaptive equalization implemented by the adaptive equalizer 26. Thus, as compared to a case where waveform distortion is compensated for only by the adaptive equalizer, it is possible to realize a reduced circuit scale of the adaptive equalizer 26. It is thus possible to improve the follow-up capability of adaptive control.

In a case where the adaptive equalizer 26 is configured to have a reduced circuit scale, the adaptive equalizer 26 has a reduced adaptive dispersion range. It is thus desired to reduce the residual dispersion in the chromatic dispersion compensator 24. For example, in a case where the setting of the chromatic dispersion compensator 24 is estimated from the type and distance of the optical transmission path, the residual dispersion may increase if the estimate differs from the actual waveform dispersion. Further, as discussed in Documents 1 through 3, in the case where the waveform dispersion is controlled on the basis of the number of corrections by the error correction circuit after demodulation, the number of corrections is calculated, and thereafter, the compensation value is controlled. Thus, it takes much time to control chromatic dispersion. According to the first embodiment, the compensation value in the chromatic dispersion compensator 24 is appropriately determined on the basis of the sensitivity of detection of sampling phase offset. It is thus possible to reduce the residual dispersion in the chromatic dispersion compensator 24. As a result, it is possible to reduce the circuit scale of the adaptive equalizer 26. Further, the compensation value may be controlled accurately, as compared to the way of estimation from the type and distance of the optical transmission path. As discussed in Documents 1 through 3, high-speed control may be realized because the first embodiment does not have synchronization and demodulation of the sampling clock and the modulation frequency on the contrary to the control of the chromatic dispersion based on the number of corrections.

Furthermore, according to the first embodiment, as step S10 in FIG. 9, the sampling signal control circuit 29 stops controlling the phase or frequency of the sampling signal when the chromatic dispersion compensator 24 controls the compensation value for chromatic dispersion. Thus, the phase of the sampling signal is swept, and as illustrated in FIG. 7, the sensitivity of detection of the sampling phase offset may be monitored.

[Second Embodiment]

Figure 10:
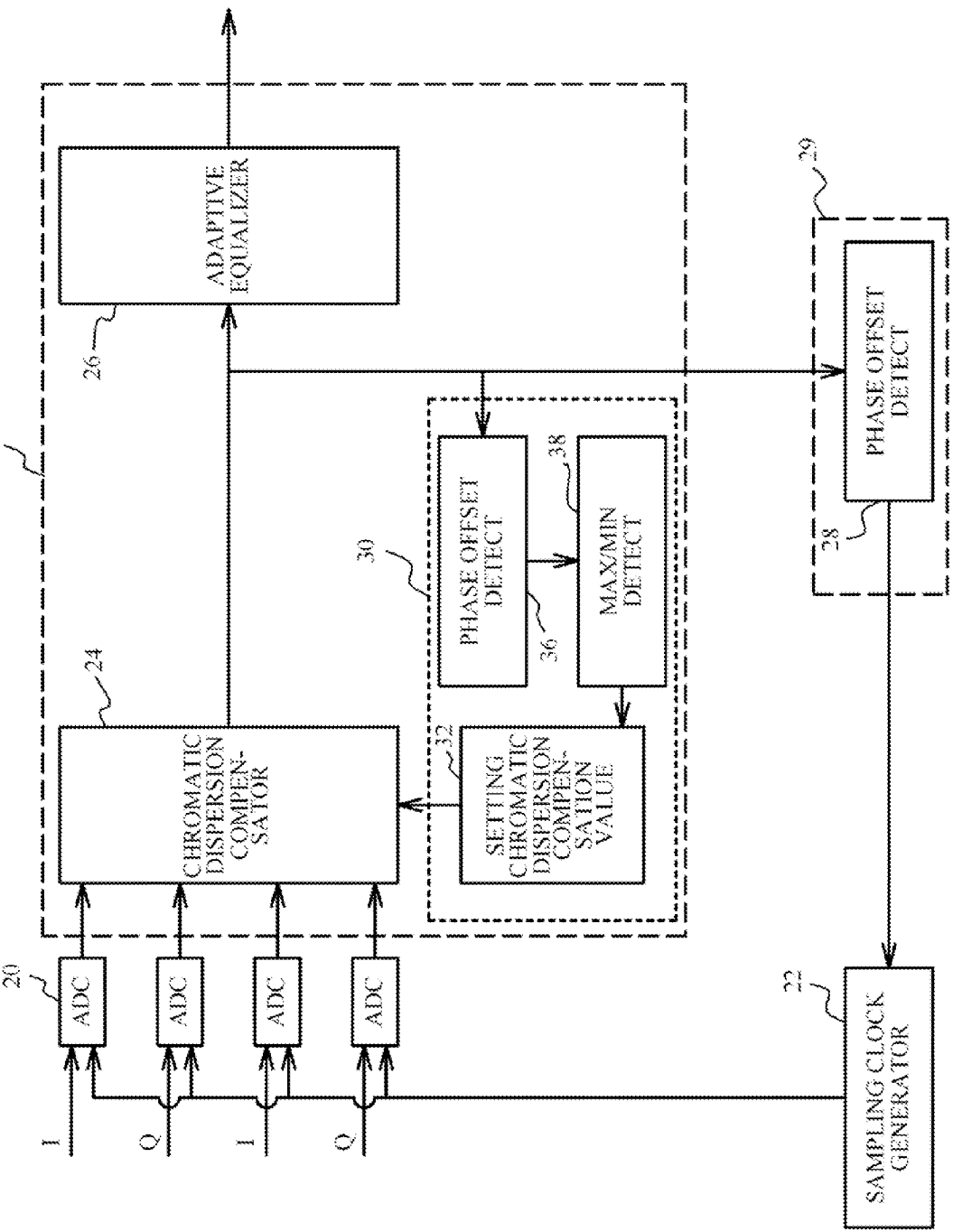
FIG. 10 is a block diagram of an equalizer and its peripheral circuits in accordance with a second embodiment.

A second embodiment has an exemplary configuration in which the compensation for chromatic dispersion is controlled by the maximum or minimum value of the sampling phase offset detected by the sampling phase offset detector 37. FIG. 10 is a block diagram of the equalizer 12 and its peripheral circuits in the second embodiment. Referring to FIG. 10, the chromatic dispersion compensation controller 30 includes the part 32 of setting the compensation value for chromatic dispersion, a sampling phase offset detector 37, and a maximum/minimum detector 38. The sampling phase offset detector 37 detects the offset of the sampling phase as in the case of the sampling phase offset detector 28. For example, in FIG. 7, the maximum/minimum detector 38 detects the maximum value and the minimum value of the sampling phase offset monitor value with respect to the sampling phase offset. The setting part 32 may determine whether the sensitivity is maximal by determining whether the currently detected sampling phase offset is maximal or minimal at step S16 illustrated in FIG. 9. The other structures are the same as those of the first embodiment illustrated in FIG. 3, and a description thereof is omitted.

The method for controlling the compensation value for chromatic dispersion by the chromatic dispersion compensation controller 30 so that the sampling phase offset monitor value is increased may be based on the sensitivity of detection of the sampling phase offset as in the case of the first embodiment. Alternatively, as in the case of the second embodiment, the maximum or minimum one of the sampling phase offset monitor values may be used as the sensitivity of detection of the sampling phase offset. The sensitivity of detection of sampling phase offset may employ the effective sampling phase offset monitor value. Although the configuration illustrated in FIG. 10 employs the separate sampling phase offset detectors 28 and 37, these detectors may be unified.

[Third Embodiment]

Figure 11:
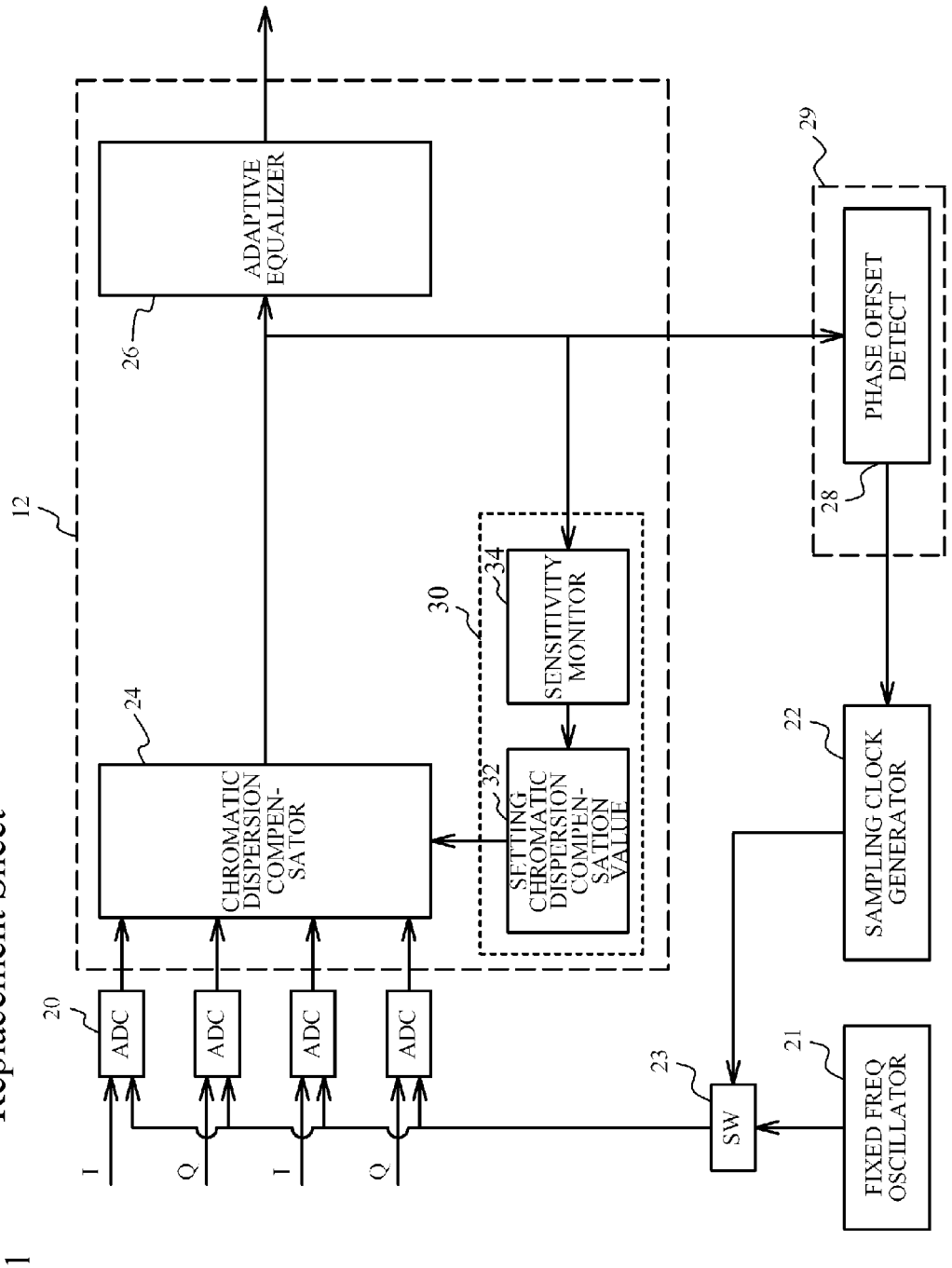
FIG. 11 is a block diagram of an equalizer and its peripheral circuits in accordance with a third embodiment.

A third embodiment uses a sampling signal that has a frequency different from natural number multiples of the modulation frequency of the optical signal when the chromatic dispersion compensation controller controls the compensation value for chromatic dispersion. FIG. 11 is a block diagram of the equalizer 12 and its peripheral circuits in the third embodiment. Referring to FIG. 11, a fixed frequency oscillator 21 and a switch 23 are provided as a signal generator. The fixed frequency oscillator 21 oscillates a signal of a frequency that differs from frequencies equal to natural number multiples of the modulation frequency of the optical signal. The switch 23 selects either the output signal of the sampling clock generator 22 or the output signal of the fixed-frequency oscillator 21, and supplies the selected signal to the ADCs 20 as the sampling signal. The other structures of the third embodiment are the same as those of the first embodiment illustrated in FIG. 3, and a description thereof is omitted.

Figure 12:
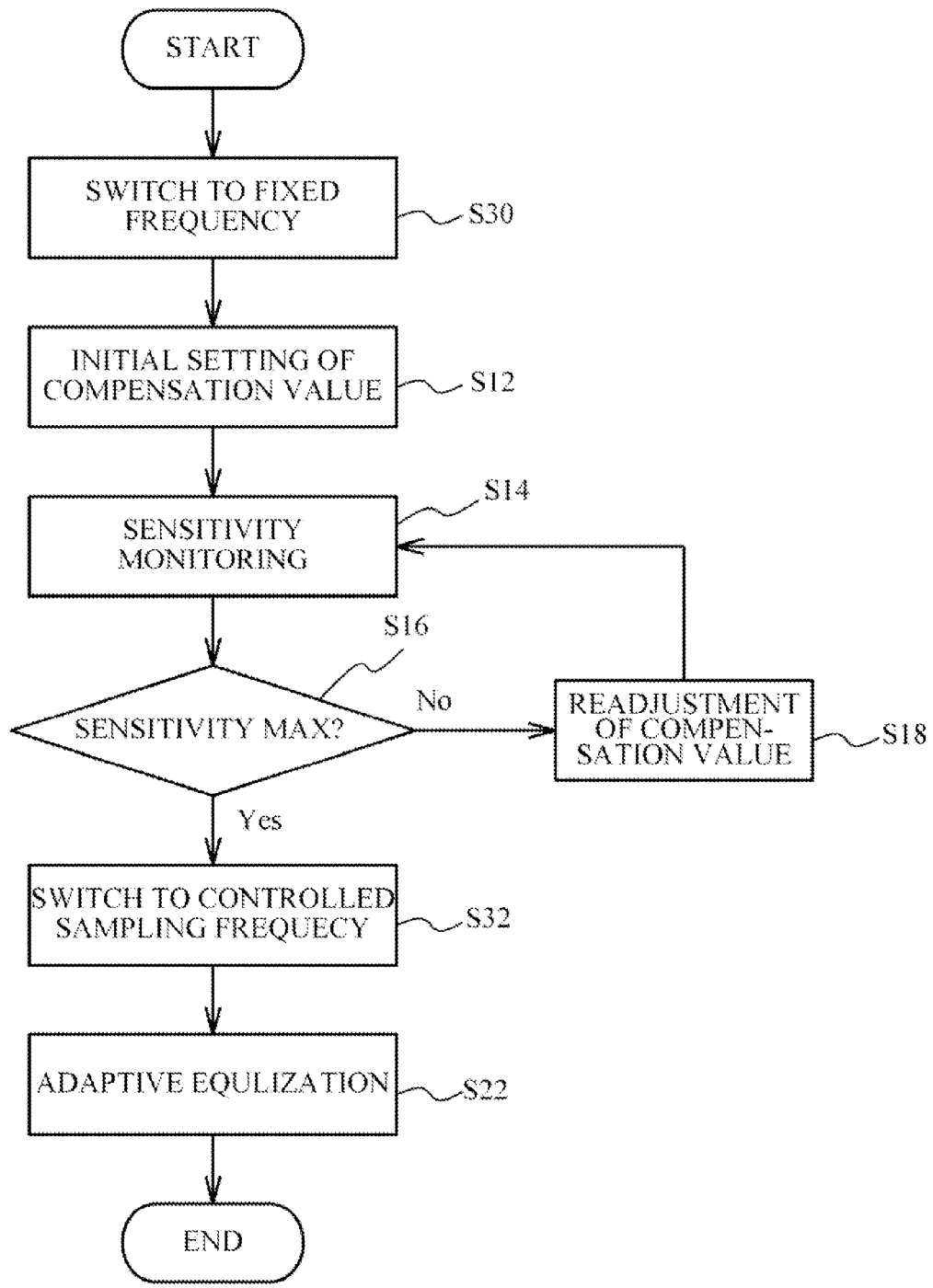
FIG. 12 is a flowchart of a process executed in a third embodiment.

FIG. 12 is a flowchart of a process of the third embodiment. Referring to FIG. 12, the switch 23 selects the fixed frequency of the fixed frequency oscillator 21 as the sampling signal (step S30). Then, steps S12 through S18 are carried out. Then, the switch 23 selects the output signal of the sampling clock generator 22 as the sampling clock (step S32). Then, the process proceeds to step S22. The other processes are the same as those of the first embodiment illustrated in FIG. 9, and a description thereof is omitted.

According to the third embodiment, as indicated by step S30 in FIG. 12, the fixed frequency oscillator 21 outputs, as the sampling signal, the signal of the frequency that differs from the natural number multiples of the modulation frequency of the optical signal when the chromatic dispersion compensation controller 30 controls the compensation value for chromatic dispersion. Since the sampling frequency differs from the modulation frequency, it is possible to quickly sweep the sampling phase offset in FIG. 7. It is thus possible to increase the speed of measurement of the sensitivity of detection. In the third embodiment, the sampling signal control circuit 29 may not stop feeding the sampling phase offset back to the sampling clock generator 22 when the chromatic dispersion compensation controller 30 controls the compensation value for chromatic dispersion.

[Fourth Embodiment]

Figure 13:
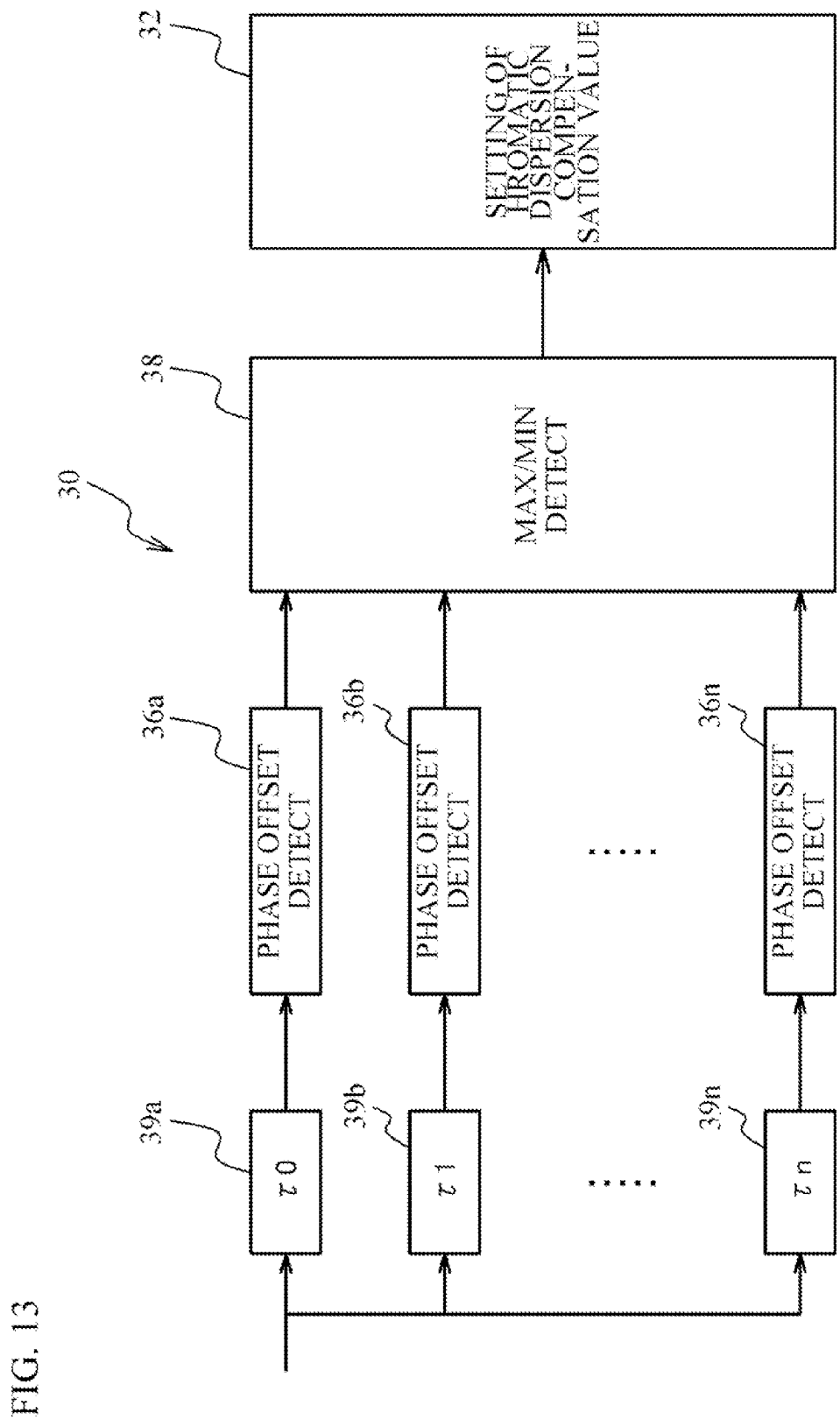
FIG. 13 is a block diagram of a chromatic dispersion compensation controller in accordance with a fourth embodiment.

A fourth embodiment has an exemplary configuration in which the phase offset is detected by delaying the output of the chromatic dispersion compensator. FIG. 13 is a block diagram of the chromatic dispersion compensation controller 30 employed in the fourth embodiment. Delay circuits 39a through 39n delay the output of the chromatic dispersion compensator 24, and output delayed outputs to sampling phase offset detectors 36a through 36n. The delay circuits 39a through 39n may, for example, be FIR filters. The maximum/minimum detector 38 detects the maximum or minimum value of the detected phase offset by referring to the outputs of the phase offset detectors 36a through 36n.

Figure 14:
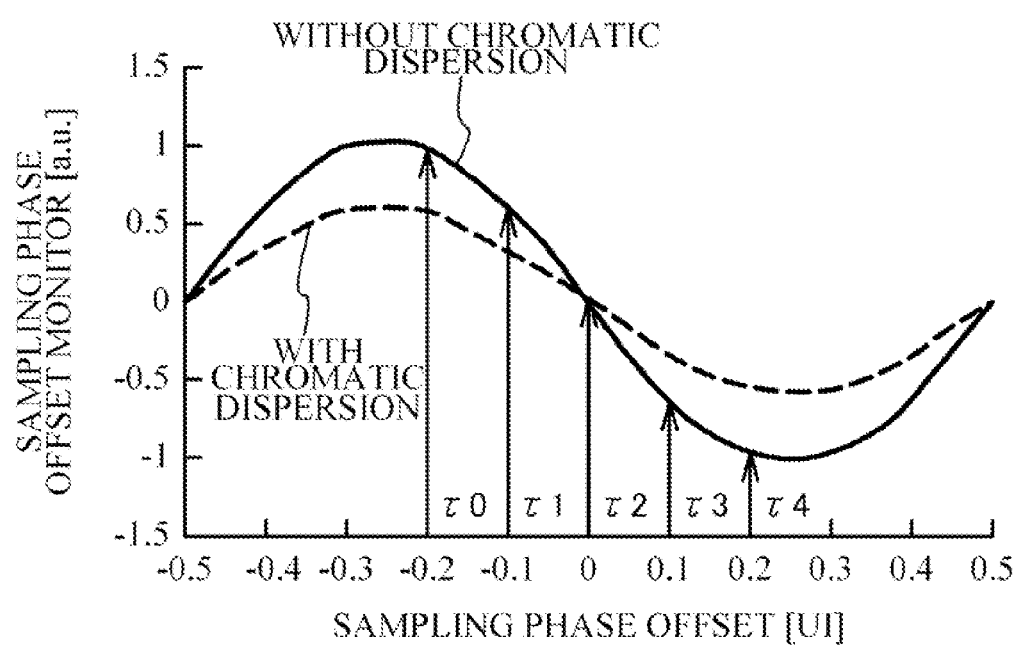
FIG. 14 is a diagram of a method for detecting maximum/minimum values by a maximum/minimum detector employed in the fourth embodiment.

FIG. 14 is a diagram that describes a method for detecting the maximum or minimum value of the phase offset detected by the maximum/minimum detector 38. Referring to FIG. 14, the phases of the output signals of the delay circuits 39a through 39n shift from the phase of the sampling signal in accordance with the delay times $\tau_0$ through $\tau_n$ of the delay circuits 39a through 39n. The delay circuits 39a through 39n delay the digital electrical signals by the respective delay times. Thus, the phase offsets are caused to detect the sensitivity of monitoring the sampling phase offset or the maximum/minimum value.

According to the fourth embodiment, the chromatic dispersion compensation controller 30 controls the compensation value for chromatic dispersion in the chromatic dispersion compensator 24 on the basis of the detected phase offset between the sampling signal and the received optical signal calculated by using the digital electrical signals delayed by the delay circuits 39a through 39n. It is thus possible for the chromatic dispersion compensation controller 30 to control the compensation value for chromatic dispersion in the chromatic dispersion compensator 24 even when the phase offset of the sampling signal is fixed to a small value.

[Fifth Embodiment]

Figure 15:
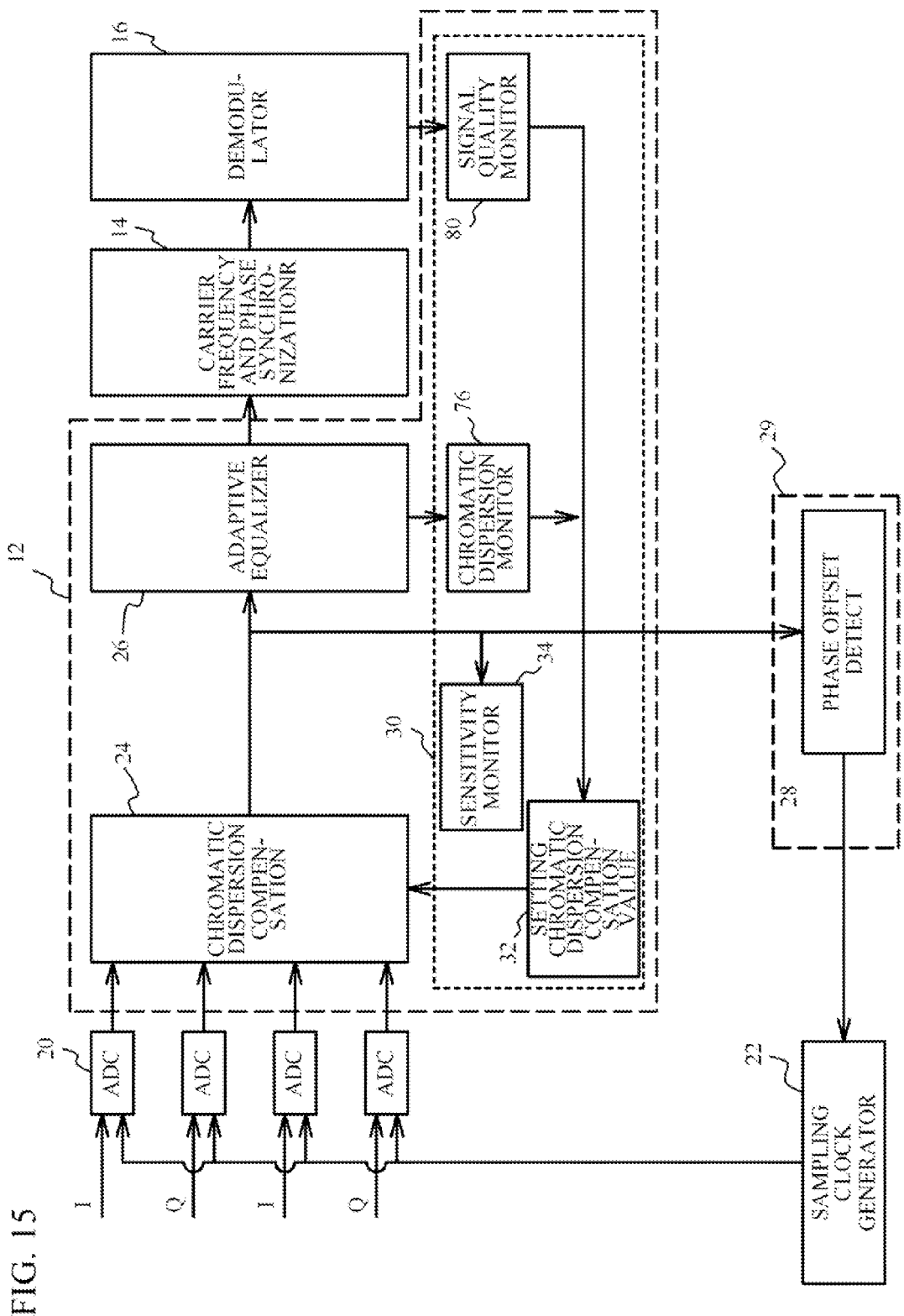
FIG. 15 is a block diagram of an equalizer and its peripheral circuits in accordance with a fifth embodiment.

A fifth embodiment has an exemplary configuration in which the chromatic dispersion compensator is controlled using the residual dispersion and the signal quality. FIG. 15 is a block diagram of the equalizer 12 and its peripheral circuits in the fifth embodiment. As compared to the first embodiment, there are provided a residual dispersion monitor 76 and a signal quality monitor 80. The residual dispersion monitor 76 monitors the residual dispersion of the adaptive equalizer 26 on the basis of the weighting factors calculated by the weighting factor calculator 74 illustrated in FIG. 6. The signal quality monitor 80 monitors the quality of the signal obtained by demodulating the digital electrical signals by the demodulator 16.

Figure 16:
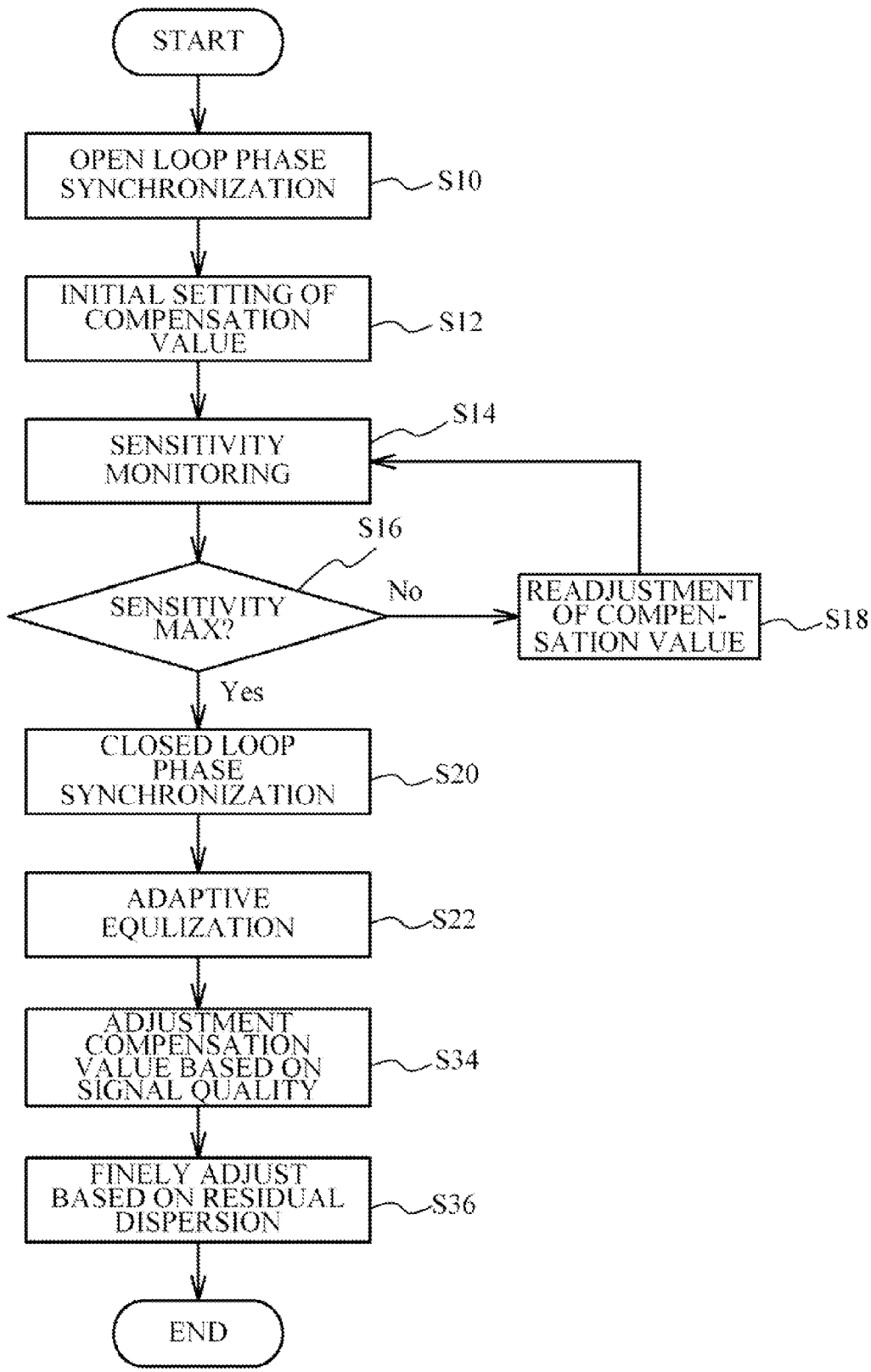
FIG. 16 is a flowchart of a process executed in the fifth embodiment.

FIG. 16 is a flowchart of a process of the fifth embodiment. Referring to FIG. 16, after step S22, the chromatic dispersion compensation controller 30 adjusts the compensation value of the chromatic dispersion compensator 24 on the basis of the signal quality (step S34). For example, the chromatic dispersion compensator 24 is controlled so as to improve the signal quality. Next, the chromatic dispersion compensation controller 30 finely adjusts the compensation value of the chromatic dispersion compensator 24 on the basis of the residual dispersion (step S36). For example, the chromatic dispersion compensator 24 is controlled so as to reduce the residual dispersion. The following process is the same as that depicted in FIG. 9, and a description thereof is omitted.

In case where the chromatic dispersion is not sufficiently compensated for by up to step S20 in FIG. 16, there is a possibility that the chromatic dispersion of the signal applied to the adaptive equalizer 26 may stand out of the range covered by the adaptive equalizer 26. Within this range, the signal demodulated by the demodulator 16 may have a poor signal quality. Taking the above into consideration, at step S34 in FIG. 16, the chromatic dispersion compensation controller 30 controls the chromatic dispersion compensator 24 on the basis of the signal quality. For example, the chromatic dispersion compensation controller 30 sets the compensation value so that a predetermined signal quality can be obtained. As described above, the signal quality is used to cause the chromatic dispersion of the output of the chromatic dispersion compensator 24 to stand within the range of compensation for dispersion by the adaptive equalizer 26 of adaptive equalization type. At step S36, the chromatic dispersion compensation controller 30 finely adjusts the compensation value for chromatic dispersion on the basis of the residual dispersion of the adaptive equalizer 26. An exemplary method for fine adjustment of the compensation value for chromatic dispersion is described in, for example, Liu et al., OFC2009, JWA36.

As described above, the chromatic dispersion compensation controller 30 controls the compensation value for chromatic dispersion on the basis of the sampling phase offset detected in any of the first through fourth embodiments. Then, the compensation value for chromatic dispersion is controlled on the basis of the quality of the signal obtained by demodulating the multiple digital electrical signals. The compensation value for the chromatic dispersion is controlled on the basis of the amount of dispersion compensated for by the adaptive equalizer 26.

In addition to the control of the chromatic dispersion using the sampling phase offset employed in any of the first through fourth embodiment, the chromatic dispersion compensator 24 may be controlled using at least one of the signal quality and the residual dispersion. In a case where the chromatic dispersion on the transmission path fluctuates in operation, it is possible to finely adjust the compensation value used in the chromatic dispersion compensation on the basis of the residual dispersion monitor.

[Sixth Embodiment]

Figure 17:
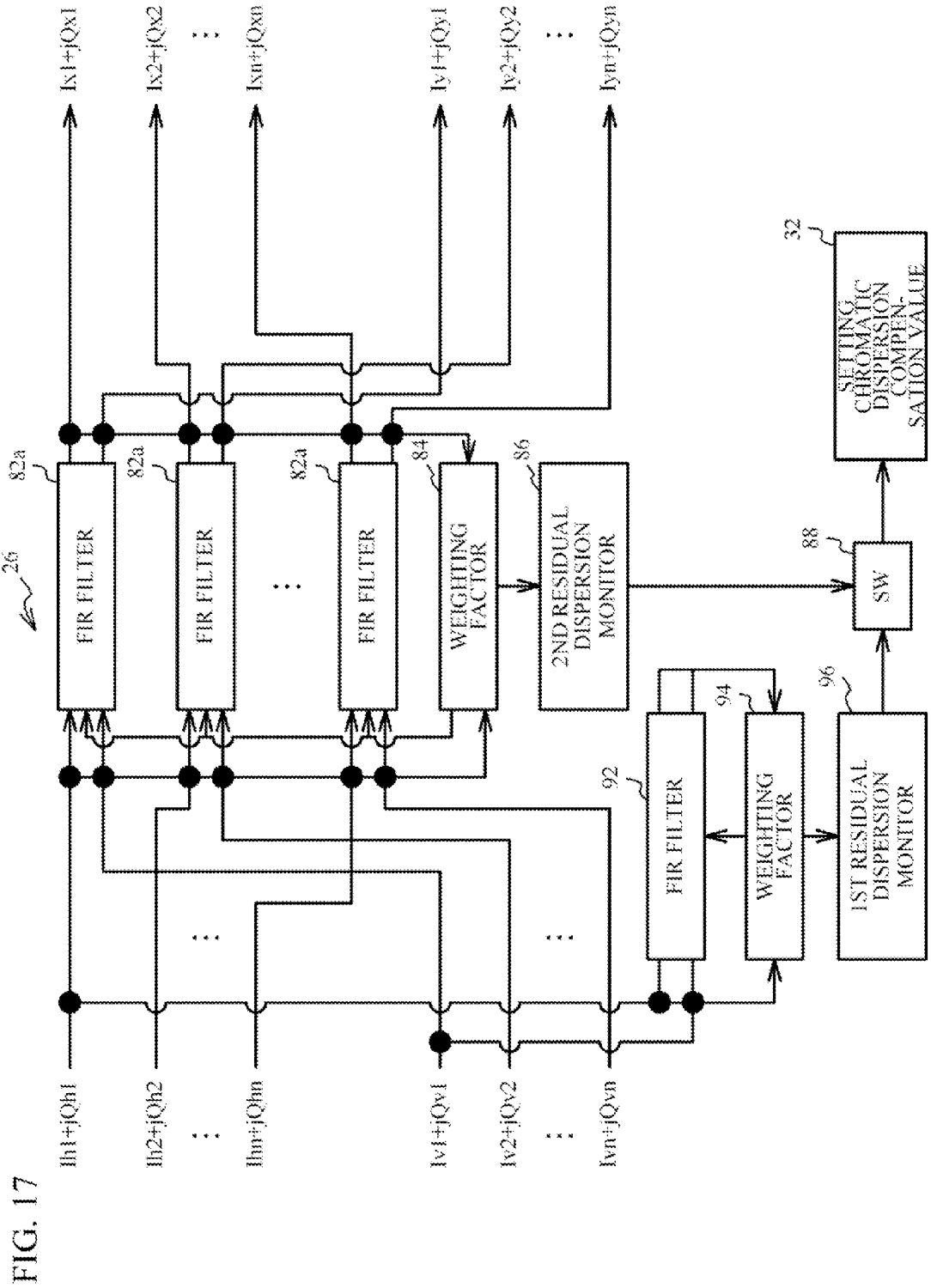
FIG. 17 is a block diagram of an adaptive equalizer in accordance with a sixth embodiment.

A sixth embodiment has an exemplary configuration in which the amount of residual dispersion in the adaptive equalizer 26 is monitored. FIG. 17 is a block diagram of the adaptive equalizer 26 employed in the sixth embodiment. The digital signal processing circuit 10 extends the digital electrical signals from the ADCs 22 in parallel form and executes a pipeline process. For example, a case where a signal of 25 GHz is processed by a frequency of 500 MHz handles 50 horizontally polarized state signals and 50 vertically polarized state signals. In FIG. 17, horizontally polarized state signals are denoted as Ih1+jQh1 through Ihn+jQhn, and vertically polarized state signals are denoted as Iv1+Qv1 through Ivn+hQvn. FIR filters 82a through 82n are butterfly type FIR filters, and correspond to the FIR filters 70a through 70d and the adders 72a and 72b.

The FIR filters 82a through 82n are supplied with the horizontally polarized state signals Ih1+jQh1 through Ihn+jQhn and the vertically polarized state signals Iv1+Qv1 through Ivn+hQvn. The FIR filters 82a through 82n output signals Ix1+jQx1 through Ixn+jQxn and Iy1+jQy1 through Iyn+jQyn, respectively. A weight factor calculation part 84 calculates the weighting factors of the FIR filters 82a through 82n so that the wave distortion is reduced. A second residual dispersion monitor 86 calculates second residual dispersion of the adaptive equalizer 26.

An FIR filter 92 is a butterfly type FIR filter, and is supplied with Ih1+jQh1 and Iv1+jQv1. The number of taps of the FIR filter 92 is greater than that of each of the FIR filters 82a through 82n. A weighting factor calculation part 94 calculates the weighing factors of the FIR filter 92. A first residual dispersion monitor 96 calculates first residual dispersion of Ih1+jQh1 and Iv1+jQv1. A switch 88 selects either the output of the first residual dispersion monitor 96 or the output of the second residual dispersion monitor 86 and supplies the selected output to the part 32 of setting the compensation value for the chromatic dispersion as the amount of residual dispersion.

Figure 18:
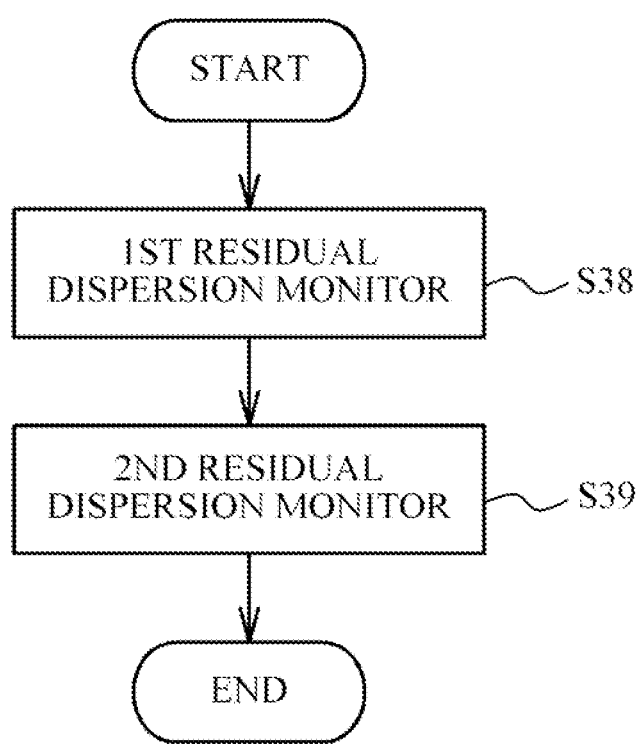
FIG. 18 is a flowchart of step S32 depicted in FIG. 16.

FIG. 18 is a flowchart of the details of step S32 depicted in FIG. 16 in the sixth embodiment. The switch 88 connects the amount of first residual dispersion output by the first residual dispersion monitor 96 to the setting part 32. The setting part 32 controls the compensation value for the chromatic dispersion on the basis of the amount of first residual dispersion (step S38). Then, the switch 88 connects the amount of second residual dispersion output by the second residual dispersion monitor 86 to the setting part 32. The setting part finely adjusts the compensation value for the chromatic dispersion on the basis of the amount of second residual dispersion (step S39).

Referring to FIG. 17, in the adaptive equalizer 26, the range in which dispersion can be compensated for may be extended by increasing the number of taps of the FIR filters 82a through 82n. However, an increased number of taps of the FIR filters 82a through 82n increases the circuit scale thereof, and degrades the follow-up capability. Taking the above into consideration, an initial step at which a signal having relatively large waveform dispersion is input is designed to use the amount of residual dispersion using the FIR filter 92 having a comparatively large number of taps to control the chromatic dispersion compensator 24. Since the FIR filter 92 has a relatively large number of taps, the dispersion compensation enable range is relatively wide. Thus, even if a signal having relatively large waveform dispersion is input, it is possible to accurately calculate the amount of residual dispersion. The FIR filter 92 is supplied with at least one signal out of the signals extended in parallel. Thus, even when a relatively large number of taps is used, the circuit scale of the whole adaptive equalizer 26 is hardly affected. In addition, the follow-up capability is good.

The fine adjustment of the compensation value by the chromatic dispersion compensator 24 carried out at the steps starting from step S36 handles the output signal of the waveform dispersion compensator 24 that does not have large waveform dispersion. Thus, the dispersion compensation is enabled within the dispersion compensation enable range defined by the FIR filters 82a through 82n having a relatively small number of taps.

According to the sixth embodiment, the chromatic dispersion compensator 24 controls the compensation value for chromatic dispersion on the basis of the amount of first residual dispersion calculated by using at least one of the signals obtained by extending the digital electrical signal in parallel. After that, the chromatic dispersion compensator 24 controls the compensation value for chromatic dispersion on the basis of the amount of second residual dispersion calculated by using all the signals obtained by extending the digital electrical signals in parallel. The number of tap of the FIR filter 92 for calculating the amount of first residual dispersion is greater than the numbers of taps of the FIR filters 82a through 82n for calculating the amount of second residual dispersion. Thus, the initial step may compensate for the chromatic dispersion of the input signal that has relatively large chromatic dispersion.

The sixth embodiment controls the compensation value for chromatic dispersion by referring to residual dispersion in addition to the control of the compensation value for chromatic dispersion by detecting the sampling phase offset and the control of the compensation value for chromatic dispersion by referring to the signal quality. The sixth embodiment may be varied to carry out only the control of the compensation value for chromatic dispersion on the basis of the residual dispersion.

[Seventh Embodiment]

Figure 19:
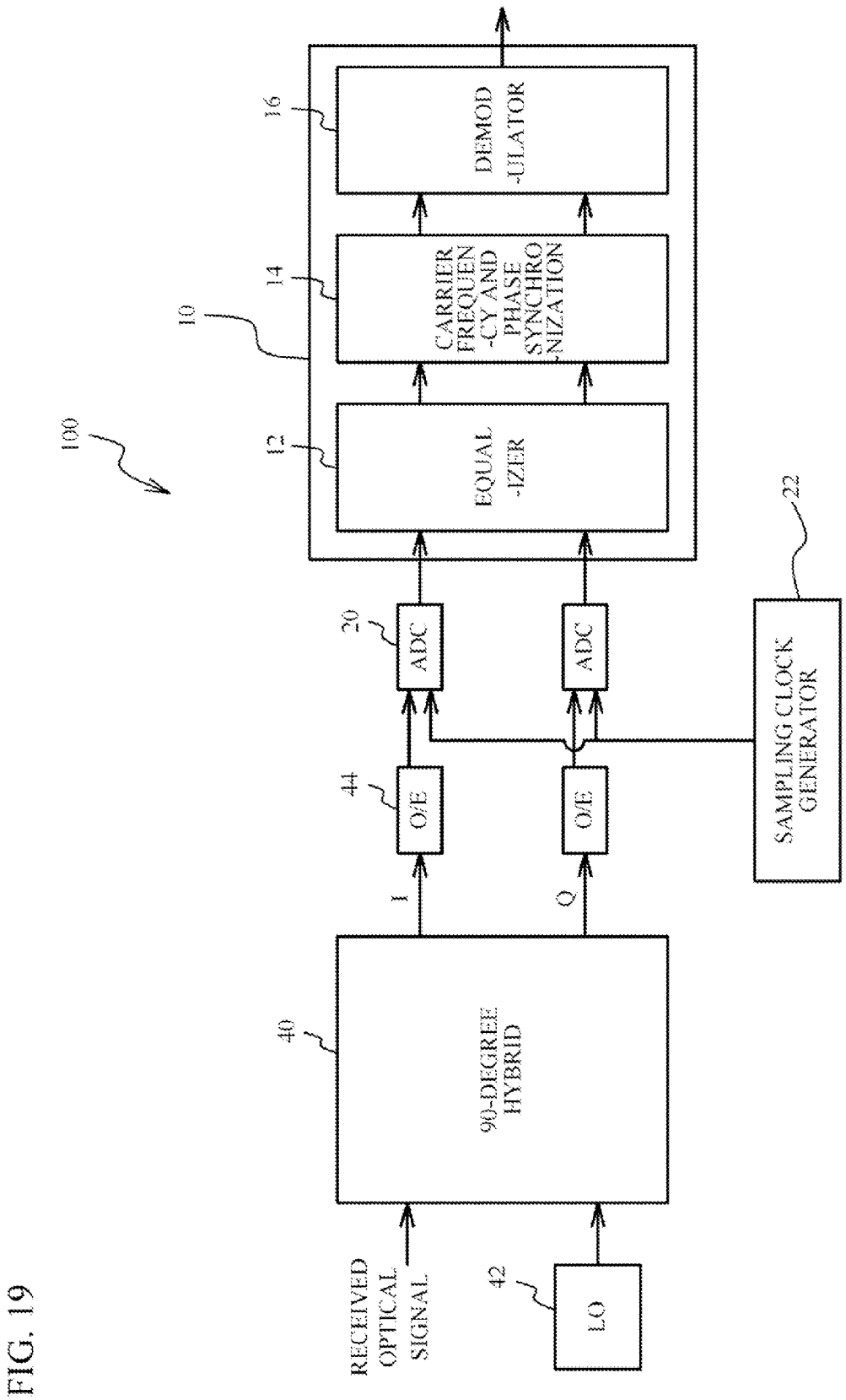
FIG. 19 is a block diagram of a receiver in accordance with a seventh embodiment.

A seventh embodiment has an exemplary configuration in which the polarization diversity is not used. FIG. 19 is a block diagram of an optical receiver in accordance with the seventh embodiment. Referring to FIG. 19, a 90-degree hybrid circuit 40 of an optical receiver 100a of the seventh embodiment is not equipped with the polarization beam splitter, and splits the received optical signal in the I and the Q. Thus, two sets of O/E conversion circuits 44 and ADCs 20 are provided. The other structures of the seventh embodiment are the same as those of the first embodiment illustrated in FIG. 1, and a description thereof is omitted. As described above, the first through sixth embodiments may be varied so as not to employ the polarization diversity.

The aforementioned first through seventh embodiments are not limited to QPSK but may employ other modulations such as mPSK (M-ary PSK) and QAM (Quadrature Amplitude Modulation). The optical signal may be multiplexed in the form of, for example, OFDM (Orthogonal Frequency Division Multiplexing) or FMD, or may employ polarized wave multiplexing.

[Eighth Embodiment]

Figure 20:
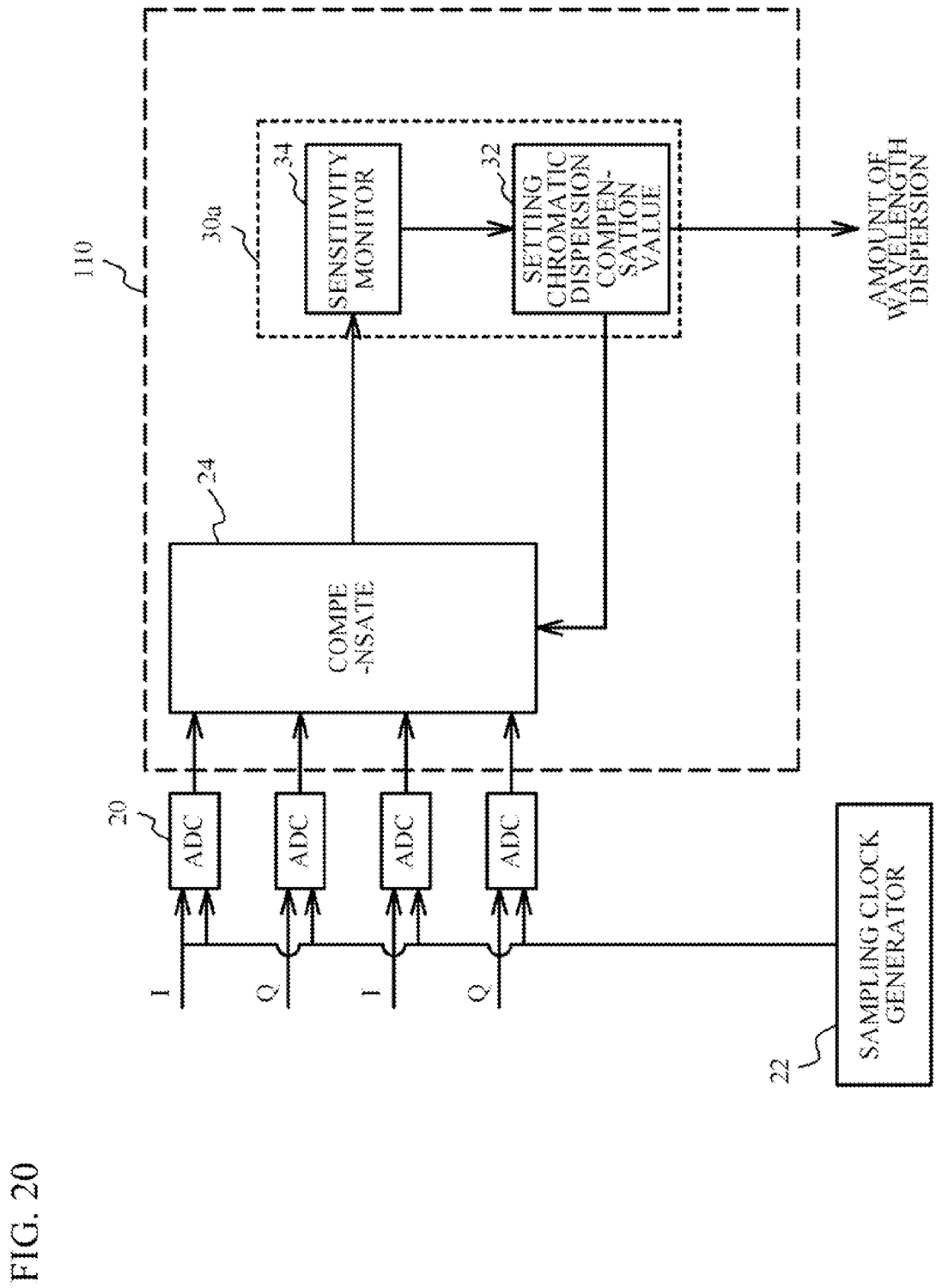
FIG. 20 is a block diagram of a chromatic dispersion detector in accordance with an eighth embodiment.

An eight embodiment is an exemplary chromatic dispersion detection device. FIG. 20 is a block diagram of a chromatic dispersion detection device in accordance with the eighth embodiment. Referring to FIG. 20, a chromatic dispersion compensation device 110 is equipped with the chromatic dispersion compensator 24 and a detector 30a. The operation of the chromatic dispersion compensator 24 is the same as that in the first embodiment. The detector 30a has a configuration similar to the chromatic dispersion compensation controller 30, and outputs the compensation value for chromatic dispersion in the chromatic dispersion compensator 24 as the amount of chromatic dispersion of the optical signal. That is, the detector 30a detects the amount of chromatic dispersion of the optical signal from the detected phase offset between the frequency of the sampling signal and the modulation frequency of the received optical signal. The frequency of the sampling signal output by the sampling clock generator 22 may be set so that the sampling phase offset is swept.

The chromatic dispersion compensation controller 30 employed in the first through seventh embodiments may detect the amount of chromatic dispersion of the optical transmission path on which the received optical signal is transmitted by the compensation value for chromatic dispersion that is appropriately set by the chromatic dispersion compensator 24.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A signal processing circuit comprising:
 a first compensator configured to compensate for waveform distortion corresponding to chromatic dispersion of a received optical signal by using digital electrical signals obtained by sampling analog electrical signals by using a sampling signal, the analog electrical signals being obtained by opto-electric conversion of multiple optical signals that related an intensity of the received optical signal and phase information thereon;
 a detector configured to detect a phase offset between the sampling signal and a modulation frequency of the received optical signal; and a chromatic dispersion compensation controller configured to control a compensation value for the chromatic dispersion in the first compensation from the digital electrical signals in which the chromatic dispersion has been compensated for so that a sensitivity is increased, the sensitivity being defined as absolute value of a slope of an output value of the detector over the phase offset obtained for the phase offset close to zero.

2. The signal processing circuit according to claim 1, further comprising a second compensator configured to compensate for residual waveform distortion in the first compensator in an adaptive equalization manner.

3. The signal processing circuit according to claim 1, further comprising a sampling signal controller configured to control a phase or frequency of the sampling signal,
wherein the sampling signal controller stops controlling the phase or frequency of the sampling signal when the chromatic dispersion compensation controller controls the compensation value for chromatic dispersion in the first compensator.

4. The signal processing circuit according to claim 1, further comprising a signal generator configured to generate, as the sampling signal, a signal of a frequency different from a natural number multiple of the modulation frequency of the received optical signal when the chromatic dispersion compensation controller controls the compensation value for chromatic dispersion in the first compensator.

5. The signal processing circuit according to claim 1, further comprising a delay circuit configured to delay the digital electrical signals in which the waveform dispersion has been compensated for by different times,
wherein the chromatic dispersion compensation controller controls the compensation value for chromatic dispersion in the first compensator from delayed digital electrical signals so that the sensitivity of the detected phase offset between the sampling signal and the modulation frequency of the received optical signal is increased.

6. A signal processing circuit comprising:
a first compensator configured to compensate for waveform distortion corresponding to chromatic dispersion of a received optical signal by using digital electrical signals obtained by sampling analog electrical signals by using a sampling signal, the analog electrical signals being obtained by opto-electric conversion of multiple optical signals that related an intensity of the received optical signal and phase information thereon;
a chromatic dispersion compensation controller configured to control a compensation value for the chromatic dispersion in the first compensation from the digital electrical signals in which the chromatic dispersion has been compensated for on the basis of a detected phase offset between the sampling signal and a modulation frequency of the received optical signal; and
a second compensator configured to compensate for residual waveform distortion in the first compensator in an adaptive equalization manner,
wherein the chromatic dispersion compensation controller:
controls the compensation value for chromatic dispersion in the first compensator on the basis of the detected phase offset;
controls the compensation value for chromatic dispersion in the first compensator on the basis of a signal quality of a demodulated signal obtained by demodulating the digital electrical signals output by the second compensator; and controls the compensation value for chromatic dispersion in the first compensator on the basis of the compensation value in the second compensator.

7. A signal processing circuit comprising:
a first compensator configured to compensate for waveform distortion corresponding to chromatic dispersion of a received optical signal by using digital electrical signals obtained by sampling analog electrical signals by using a sampling signal, the analog electrical signals being obtained by opto-electric conversion of multiple optical signals that related an intensity of the received optical signal and phase information thereon;
a chromatic dispersion compensation controller configured to control a compensation value for the chromatic dispersion in the first compensation from the digital electrical signals in which the chromatic dispersion has been compensated for on the basis of a detected phase offset between the sampling signal and a modulation frequency of the received optical signal; and
a second compensator configured to compensate for residual waveform distortion in the first compensator in an adaptive equalization manner,
wherein:
the chromatic dispersion compensation controller controls the compensation value for chromatic dispersion in the first compensator on the basis of an amount of first residual dispersion obtained by using at least one of signals obtained by extending the digital electrical signals in parallel, and then controls the compensation value for chromatic dispersion in the first compensator on the basis of an amount of second residual dispersion obtained by using all of the signals obtained by extending the digital electrical signals in parallel; and
the number of taps of an FIR filter used for obtaining the amount of the first residual dispersion is greater than that of an FIR filter used for obtaining the amount of the second residual dispersion.

8. An optical receiver comprising:
an analog-to-digital circuit configured to convert analog electrical signals into digital electrical signals by sampling the analog electrical signals with a sampling signal, the analog electrical signals being obtained by opto-electric conversion of multiple optical signals that include an intensity of the received optical signal and phase information thereon;
a first compensator configured to compensate for waveform distortion corresponding to chromatic dispersion of the received optical signal from the digital electrical signals;
a detector configured to detect a phase offset between the sampling signal and a modulation frequency of the received optical signal; and
a chromatic dispersion compensation controller configured to control the compensation value for chromatic dispersion in the first compensator from digital electrical signals in which the chromatic dispersion has been compensated for so that a sensitivity is increased, the sensitivity being defined as absolute value of a slope of an output value of the detector over the phase offset obtained for the phase offset close to zero.

9. The optical receiver according to claim 8, further comprising a second compensator configured to compensate for residual waveform distortion in the first compensator in an adaptive equalization manner.

10. The optical receiver according to claim 8, further comprising a sampling signal controller configured to control a phase or frequency of the sampling signal, wherein the sampling signal controller stops controlling the phase or frequency of the sampling signal when the chromatic dispersion compensation controller controls the compensation value for chromatic dispersion in the first compensator.

11. The optical receiver according to claim 8, further comprising a signal generator configured to generate, as the sampling signal, a signal of a frequency different from a natural number multiple of the modulation frequency of the received optical signal when the chromatic dispersion compensation controller controls the compensation value for chromatic dispersion in the first compensator.

12. The optical receiver according to claim 8, further comprising a delay circuit configured to delay the digital electrical signals in which the waveform dispersion has been compensated for by different times,
wherein the chromatic dispersion compensation controller controls the compensation value for chromatic dispersion in the first compensator from delayed digital electrical signals on the basis of the detected phase offset between the sampling signal and the modulation frequency of the received optical signal.

13. An optical receiver comprising:
an analog-to-digital circuit configured to convert analog electrical signals into digital electrical signals by sampling the analog electrical signals with a sampling signal, the analog electrical signals being obtained by opto-electric conversion of multiple optical signals that include an intensity of the received optical signal and phase information thereon;
a first compensator configured to compensate for waveform distortion corresponding to chromatic dispersion of the received optical signal from the digital electrical signals;
a chromatic dispersion compensation controller configured to control the compensation value for chromatic dispersion in the first compensator from digital electrical signals in which the chromatic dispersion has been compensated for on the basis of a detected phase offset between the sampling signal and a modulation frequency of the received optical signal; and
a second compensator configured to compensate for residual waveform distortion in the first compensator in an adaptive equalization manner,
wherein the chromatic dispersion compensation controller:
controls the compensation value for chromatic dispersion in the first compensator on the basis of the detected phase offset;
controls the compensation value for chromatic dispersion in the first compensator on the basis of a signal quality of a demodulated signal obtained by demodulating the digital electrical signals output by the second compensator; and
controls the compensation value for chromatic dispersion in the first compensator on the basis of the compensation value in the second compensator.

14. An optical receiver comprising:
an analog-to-digital circuit configured to convert analog electrical signals into digital electrical signals by sampling the analog electrical signals with a sampling signal, the analog electrical signals being obtained by opto-electric conversion of multiple optical signals that include an intensity of the received optical signal and phase information thereon;
a first compensator configured to compensate for waveform distortion corresponding to chromatic dispersion of the received optical signal from the digital electrical signals;
a chromatic dispersion compensation controller configured to control the compensation value for chromatic dispersion in the first compensator from digital electrical signals in which the chromatic dispersion has been compensated for on the basis of a detected phase offset between the sampling signal and a modulation frequency of the received optical signal; and
a second compensator configured to compensate for residual waveform distortion in the first compensator in an adaptive equalization manner,
wherein:
the chromatic dispersion compensation controller controls the compensation value for chromatic dispersion in the first compensator on the basis of an amount of first residual dispersion obtained by using at least one of signals obtained by extending the digital electrical signals in parallel, and then controls the compensation value for chromatic dispersion in the first compensator on the basis of an amount of second residual dispersion obtained by using all of the signals obtained by extending the digital electrical signals in parallel; and
the number of taps of an FIR filter used for obtaining the amount of the first residual dispersion is greater than that of an FIR filter used for obtaining the amount of the second residual dispersion.

15. A detector comprising:
a first compensator configured to compensate for waveform distortion corresponding to chromatic dispersion of a received optical signal by using digital electrical signals obtained by sampling analog electrical signals by using a sampling signal, the analog electrical signals being obtained by opto-electric conversion of multiple optical signals that include an intensity of the received optical signal and phase information thereon;
a detector configured to detect a detected phase offset between the sampling signal and a modulation frequency of the received optical signal; and
a detector configured to detect an amount of dispersion for chromatic dispersion of the received optical signal from the digital electrical signals in which the chromatic dispersion has been compensated for so that a a sensitivity is increased, the sensitivity being defined as absolute value of a slope of an output value of the detector over the phase offset obtained for the phase offset close to zero.

16. A method comprising:
compensating for waveform distortion corresponding to chromatic dispersion of a received optical signal by using digital electrical signals obtained by sampling analog electrical signals by using a sampling signal, the analog electrical signals being obtained by opto-electric conversion of multiple optical signals that include an intensity of the received optical signal and phase information thereon;
detecting a phase offset between the sampling signal and a modulation frequency of the received optical signal by using a detector; and
controlling a compensation value for the chromatic dispersion in the first compensation from the digital electrical signals in which the chromatic dispersion has been compensated for so that a sensitivity is increased, the sensitivity being defined as absolute value of a slope of an output value of the detector over the phase offset obtained for the phase offset close to zero.

* * * * *